United States Patent
Ramanathan et al.

(10) Patent No.: US 7,321,580 B1
(45) Date of Patent: Jan. 22, 2008

(54) DIRECTIONAL CARRIER SENSE MEDIUM ACCESS FOR WIRELESS NODES

(75) Inventors: Subramanian Ramanathan, Concord, MA (US); Cesar A. Santivanez, Boston, MA (US)

(73) Assignee: BBN Technologies Corp., Cambridge, MA (US)

( * ) Notice: Subject to any disclaimer, the term of this patent is extended or adjusted under 35 U.S.C. 154(b) by 1136 days.

(21) Appl. No.: 10/273,748

(22) Filed: Oct. 18, 2002

(51) Int. Cl.
*H04Q 7/00* (2006.01)

(52) U.S. Cl. ............... 370/339; 370/752; 370/329; 455/456.4

(58) Field of Classification Search ........... 370/328, 370/329, 339, 252, 338; 455/450, 456.1, 455/456.4

See application file for complete search history.

(56) References Cited

U.S. PATENT DOCUMENTS

| | | | | |
|---|---|---|---|---|
| 5,898,733 | A * | 4/1999 | Satyanarayana | ............ 375/133 |
| 7,139,262 | B1 * | 11/2006 | Elliott | ............ 370/351 |
| 7,177,294 | B2 * | 2/2007 | Chen et al. | ............ 370/338 |

OTHER PUBLICATIONS

"A technical Tutorial on the IEEE 802.11 Protocol" by Panlo Brenner, Jul. 18, 1996.*

Ji-Ning Duan, LiJen Ko, and Babak Daneshrad, Versatile Beamforming ASIC Architecture for Broadband Fixed Wireless Access, Proceedings of the Custom Integrated Circuits Conference, IEEE, 1999, pp. 545-548.

Haitao Wu, Yong Peng, Keping Long, Shiduan Cheng, and Jian Ma, Performance of Reliable Transport Protocol over IEEE 802.11 Wireless LAN: Analysis and Enhancement, INFOCOM 2002, Twenty-First Annual Joint Conference of the IEEE Computer and Communications Societies Proceedings, IEEE, vol. 2, 2002, pp. 599-607.

Young-Bae Ko, Vinaychandra Shankarkumar, and Nitin H. Vaidya, Medium Access Control Protocols Using Directional Antennas in Ad Hoc Networks, Proc. Of IEEE Infocom, Mar. 2000, pp. 13-21.

Romit Roy Coudhury, Xue Yang, Ram Ramanathan and Nitin H. Vaidya, Using Directional Antennas for Medium Access Control in Ad Hoc Networks, Proc. Of ACM Mobicom, Sep. 2002, 12 Pages.

A. Nasipuri, S. Ye, J. You, and R. E. Hiromoto, A MAC Protocol for Mobile Ad Hoc Networks using Directional Antennas, Proc. Of IEEE WCNC, Sep. 2000, pp. 1214-1219.

Nader S. Fahmy, Terence D. Todd, and Vytas Kezys, Ad Hoc Networks with Smart Antennas Using IEEE 802.11-Based Protocols, Proc. Of IEEE ICC, Apr. 2002, pp. 3144-3148.

\* cited by examiner

*Primary Examiner*—John Pezzlo
(74) *Attorney, Agent, or Firm*—Ropes & Gray LLP

(57) ABSTRACT

A method (508) and system (226) provide directional medium access control for wireless nodes (102) in a wireless network (100), each of the nodes (102) having a transceiver (228) and a plurality of antennas (232, 234, 236, 238, 240) in selective communication with the transceiver (228). Packets (202) are transmitted from a transmitting node (106) of the nodes (102) when a channel (104) is sensed as being free in a beam direction of a selected one of the antennas (232, 234, 236, 238, 240), and in accordance with a pre-determined transmission mode (304) for the data packet (202). The transmitting node (106) is periodically placed in a forced idle state, thereby being prevented from transmitting data packets (202), but being able to receive and respond to data packets (202) from other nodes (102).

51 Claims, 17 Drawing Sheets

| RADIO PROFILE | | 300 |
| --- | --- | --- |
| BEAMFORMING MODE | OMNI | 302 |
| TX POWER LEVEL | 20 dBm | |
| TRANSMISSION MODE | A | 304 |

| TRANSMISSION MODE | | |
| --- | --- | --- |
| | UNRELIABLE | RELIABLE |
| | NO ACK | ACK |
| NO RTS | A | B |
| RTS | C | D |

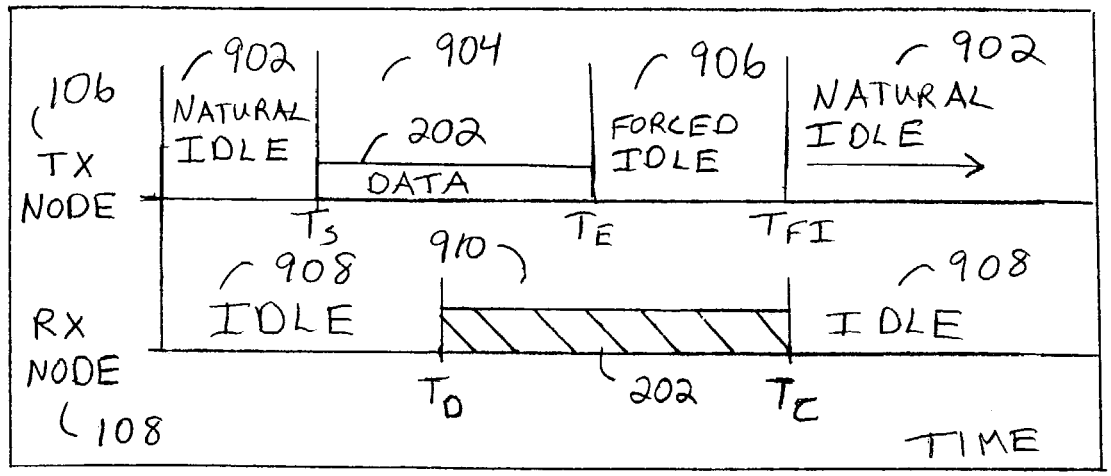
FIG. 9      900
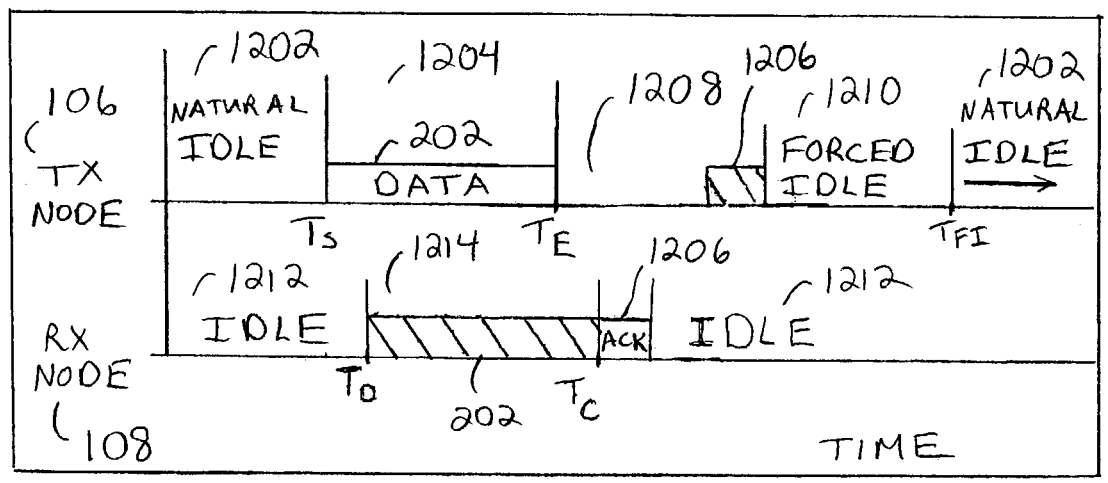
FIG. 12     1200

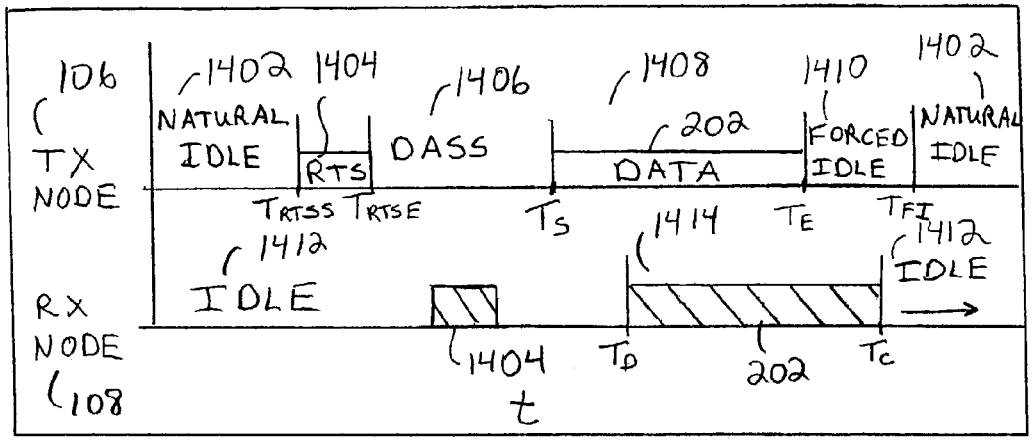
FIG. 14      1400
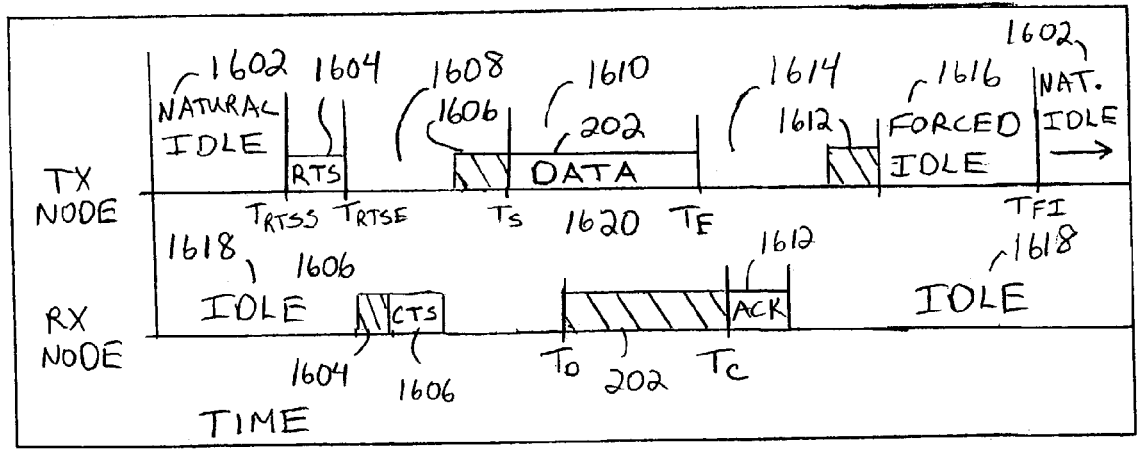
FIG. 16      1600

DIRECTIONAL CARRIER SENSE MEDIUM ACCESS FOR WIRELESS NODES

GOVERNMENT RIGHTS

This invention was made with Government support under DAAD19-01-C-0027 awarded by the United States Army. The Government has certain rights in this invention.

TECHNICAL FIELD OF THE INVENTION

The present invention relates to the field of wireless communication networks. More specifically, the present invention relates to access control of transmission media within a wireless network.

BACKGROUND OF THE INVENTION

Over recent years, the market for wireless communications has enjoyed tremendous growth. Wireless technology now reaches or is capable of reaching virtually every location on earth. This rapid growth in wireless communication technology and portable computing platforms has led to significant interest in the design and development of instantly deployable, wireless networks often referred to as "ad-hoc networks". An ad-hoc wireless network of nodes is desirable in situations where a fixed communication infrastructure, wired or wireless, does not exist or has been destroyed.

The application of ad-hoc networks spans several different sectors of society. In the civilian sector, an ad-hoc network may be used to interconnect working groups moving in an urban or rural area, on a campus engaged in collaborative operations, such as, distributed scientific experiments, or in hospital settings. In the law enforcement sector, an ad-hoc network may be employed in situations such as crowd control, border patrol, and search and rescue operations. In the military sector, modern communications in a battlefield or in a special operations context require a very sophisticated instant infrastructure with complex requirements and constraints pertaining to network security, capacity, latency, and robustness.

One approach envisioned for improving ad-hoc wireless network security is the use of multiple antennas at each of the nodes within the wireless network. More specifically, each node within the wireless network is equipped with a single transceiver and multiple antennas, one or more of which may be directional or beamforming antennas. By using multiple directional antennas in selective communication with a single transceiver, packets may be transmitted from a node in a desired direction toward another node within the wireless network without leaking to other locations, i.e., without being transmitted omnidirectionally. The directional transmission of signals decreases the probability of interception of the signals by hostile or inappropriate parties, as contrasted with the wide, circular coverage obtained through the use of an omnidirectional antenna. As such, directional transmission effectively increases transmission security.

In addition, directional antennas can advantageously exploit spatial redundancy. In other words, a directional antenna picks out the desired signal of each user while suppressing multiple access interference arriving from different directions. This reduced interference can be exploited to obtain a higher effective network capacity.

Unlike omni-directional antennas where energy power radiates equally in all directions, directional antennas concentrate energy power in a particular direction. This translates into power gain, thus improving the signal-to-noise ratio and effectively extending the range of directional transmissions. This extended range of directional transmissions can be exploited to obtain reduced packet latency and more robust connectivity.

Transmission medium access is an integral part of a wireless network. Indeed, the ability to provide reliable data transfer and congestion control is fundamental to the success of a wireless network. A Carrier Sense Multiple Access (CSMA) with Collision Avoidance (CA) approach has been employed for wireless local area networks (LANs) and has been proposed for ad hoc networks. In particular, the Institute of Electrical and Electronic Engineers (IEEE) 802.11 standard is based on this approach. The 802.11 standard specifies a common medium access control (MAC) layer, which manages and maintains communications between 802.11-based nodes by coordinating access to a shared transmission medium (i.e., radio channel) and by utilizing protocols that enhance communications over the wireless transmission medium. The 802.11 MAC Layer typically uses an 802.11 Physical (PHY) Layer, such as 802.11a or 802.11b, to perform the tasks of carrier sensing, transmission, and receiving of 802.11 packets (i.e., frames).

Unfortunately, the 802.11 MAC layer protocol is not capable of switching between the multiple antennas in selective communication with a single transceiver of the wireless node. Nor is the 802.11 MAC layer protocol capable of determining when to switch between the multiple antennas. Thus, what is needed is a system and method for controlling access to a transmission medium in a wireless network of nodes. Moreover, what is needed is a system and method for exploiting the efficient utilization of a wireless network of nodes, each having a single transceiver and multiple antennas.

SUMMARY OF THE INVENTION

Accordingly, it is an advantage of the present invention that a method and system are provided in a wireless network of nodes for controlling access to a transmission medium.

It is another advantage of the present invention that a method and system are provided that exploit the efficient use of directional antennas at each node within a wireless network of nodes.

Yet another advantage of the present invention is that the method and system enhance network performance in terms of capacity, latency, robustness, and security.

The above and other advantages of the present invention are carried out in a wireless network of nodes, each of the nodes having a transceiver and a plurality of antennas in communication with the transceiver, in one form by a computer-based method for controlling access to a transmission medium. The method calls for obtaining a packet for transmission at the transceiver of a transmitting node of the nodes, the packet including a destination identifier of a receiving node of the nodes. A transmitting antenna is selected from the plurality of antennas in response to the destination identifier. The method further calls for switching to the transmitting antenna and determining whether the transmission medium is free in a beam direction of the transmitting antenna. When the transmission medium is free, the packet is transmitted from the transmitting antenna over the transmission medium.

The above and other advantages of the present invention are carried out in another form by a system in a node of a wireless network for controlling access to a transmission medium, the node being capable of communicating with other nodes in the wireless network over the transmission medium. The node includes a router for providing a packet for transmission over said transmission medium, the packet including a destination identifier of a receiving node of the other nodes. The node further includes a transceiver for obtaining the packet from the router, an omnidirectional antenna, directional antennas, and a switch selectively interconnecting the omnidirectional antenna and the directional antennas with the transceiver. The system includes a processor, in communication with the router and the transceiver for controlling access to the transmission medium. A memory element is in communication with the processor for storing a database of transmission characteristics for each of said omnidirectional and directional antennas. The processor performs operations comprising accessing the database to select one of the omnidirectional antenna and the directional antennas to be a transmitting antenna in response to the destination identifier. The processor performs further operations of activating the switch to interconnect the transceiver and the transmitting antenna and performing carrier sensing on the transmitting antenna to determine whether the transmission medium is free in a beam direction of the transmitting antenna. When the transmission medium is free, transmission of the packet is initiated from the transmitting antenna over the transmission medium, and when the transmission medium is busy, transmission of the packet is prevented.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 3 shows a table of an exemplary radio profile generated for a data packet to be transmitted from the node of FIG. 2;

FIG. 4 shows a table of transmission modes used by a directional media access control system of the present invention;

FIG. 9 shows a state diagram of data packet transmission and reception activities between a transmitting node and a receiving node in response to the execution of the mode A transmit subprocess of FIG. 8;

FIG. 12 shows a state diagram of data packet transmission and reception activities between a transmitting node and a receiving node in response to the execution of the mode B transmit subprocess of FIG. 11;

FIG. 14 shows a state diagram of data packet transmission and reception activities between a transmitting node and a receiving node in response to the execution of the mode C transmit subprocess of FIG. 13;

FIG. 16 shows a state diagram of data packet transmission and reception activities between a transmitting node and a receiving node in response to the execution of the mode D transmit subprocess of FIG. 15;

DETAILED DESCRIPTION OF THE PREFERRED EMBODIMENTS

The present invention controls access to transmission media, i.e., channels or wireless links, within a wireless network of nodes, each equipped with one transceiver and multiple antennas. The invention achieves efficient wireless networking (including peer-to-peer "ad hoc" networking) by controlling the selection of antennas, controlling access to the transmission media, and controlling the transmission power level of a signal.

Figure 1:
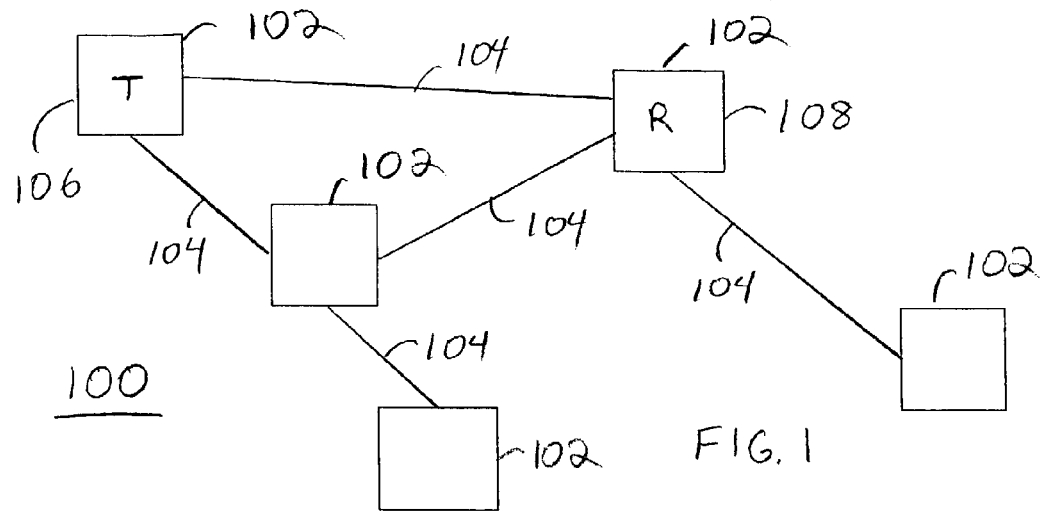
FIG. 1 shows a schematic diagram of a wireless network of nodes.
Figure 10:
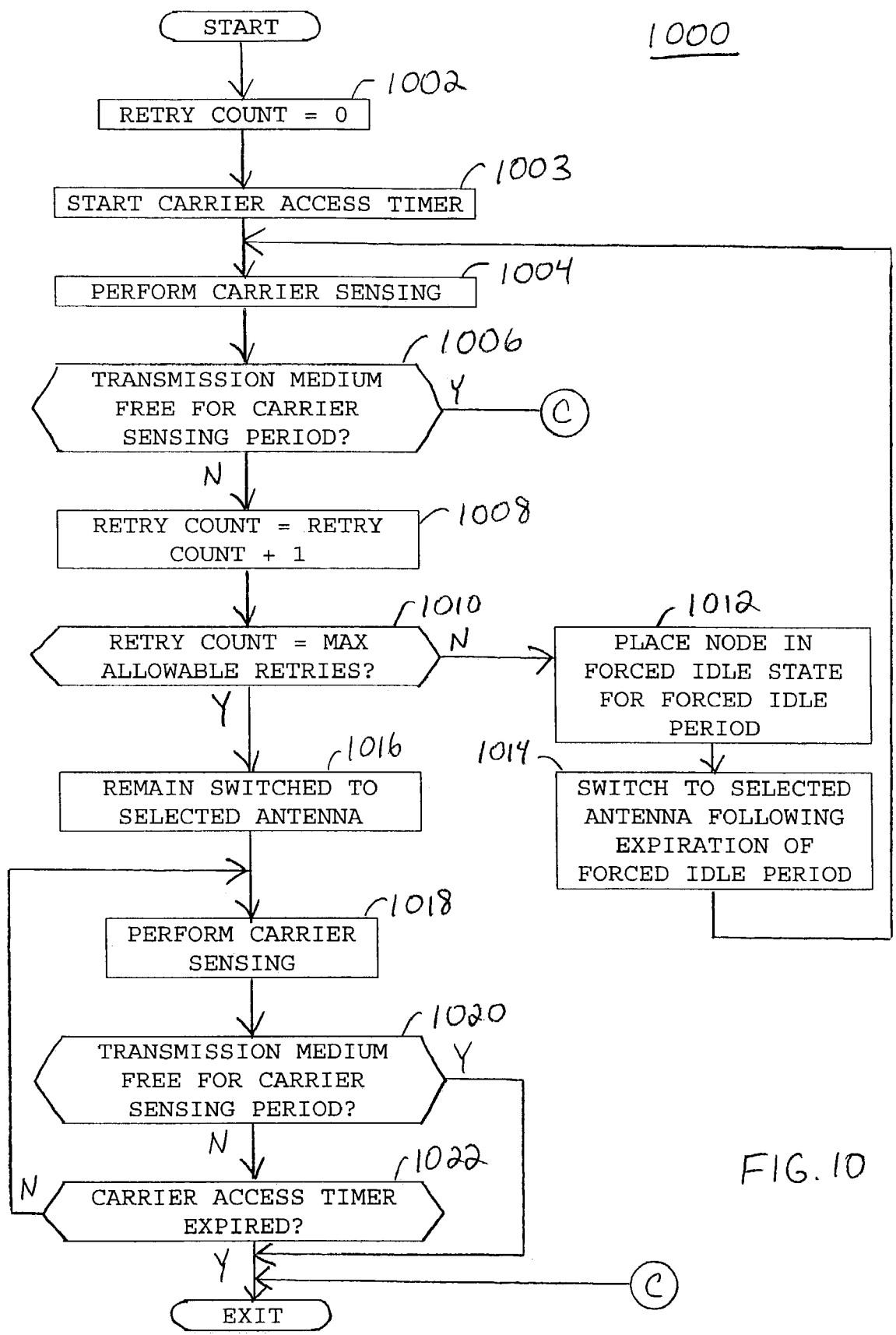
FIG. 10 shows a flowchart of a medium access subprocess implemented through the execution of the access control process of FIG. 6.

Throughout this discussion, items are assigned three- or four-digit reference numbers whose first digit or first two digits reflects the Figure in which the item first appears. That is, items first appearing in FIG. 1 are assigned reference numbers between 100 and 199, items first appearing in FIG. 10 are assigned reference numbers between 1000 and 1099, etc. Once assigned, a given reference number is used in all Figures in which that item appears.

FIG. 1

FIG. 1 shows a schematic diagram of a wireless network 100 of nodes 102. Nodes 102 may be periodically interconnected via transmission media of channels 104. The term "channel" used herein is a path of communication between two or more points. As such, channels 104 are electromagnetic, or wireless, links between two or more nodes 102. Nodes 102 exchange information in the form of data packets, also known as frames, between other nodes 102 via channels 104. The present invention is implemented in wireless network 100 for enhancing the performance of network 100 in terms of capacity, latency, robustness, and security.

Wireless network 100 may be a "mobile ad hoc network". A mobile ad hoc network is an autonomous system of mobile nodes connected by wireless links—the union of which form an arbitrary network topology. The nodes are free to move randomly and organize themselves arbitrarily; thus, the network's wireless topology may change rapidly and unpredictably. Such a network may operate in a standalone fashion, or may be connected to the larger Internet. The present invention is advantageously implemented in a mobile ad-hoc network. However, it should be understood that the present invention may alternatively be implemented in network of nodes having a fixed communication infrastructure.

For simplicity of illustration a first one of nodes 102 will be referred to hereinafter as a transmitting node 106, and a second one of nodes 102 will be referred to hereinafter as a receiving node 108. The term "transmitting" is used herein to distinguish one of nodes 102 that requires access to channels 104 in order to transmit a data packet (described below) to others of nodes 102. In contrast, the term "receiving" is used herein to distinguish another one or more of nodes 102 for which the transmitted data packet is intended. Accordingly, although the present invention is described in terms of one of nodes 102 being transmitting node 106 and another one of nodes 102 being receiving node 108, it should be understood that at any given instant others of nodes 102 may be a transmitting node or a receiving node.

FIG. 2

Figure 2:
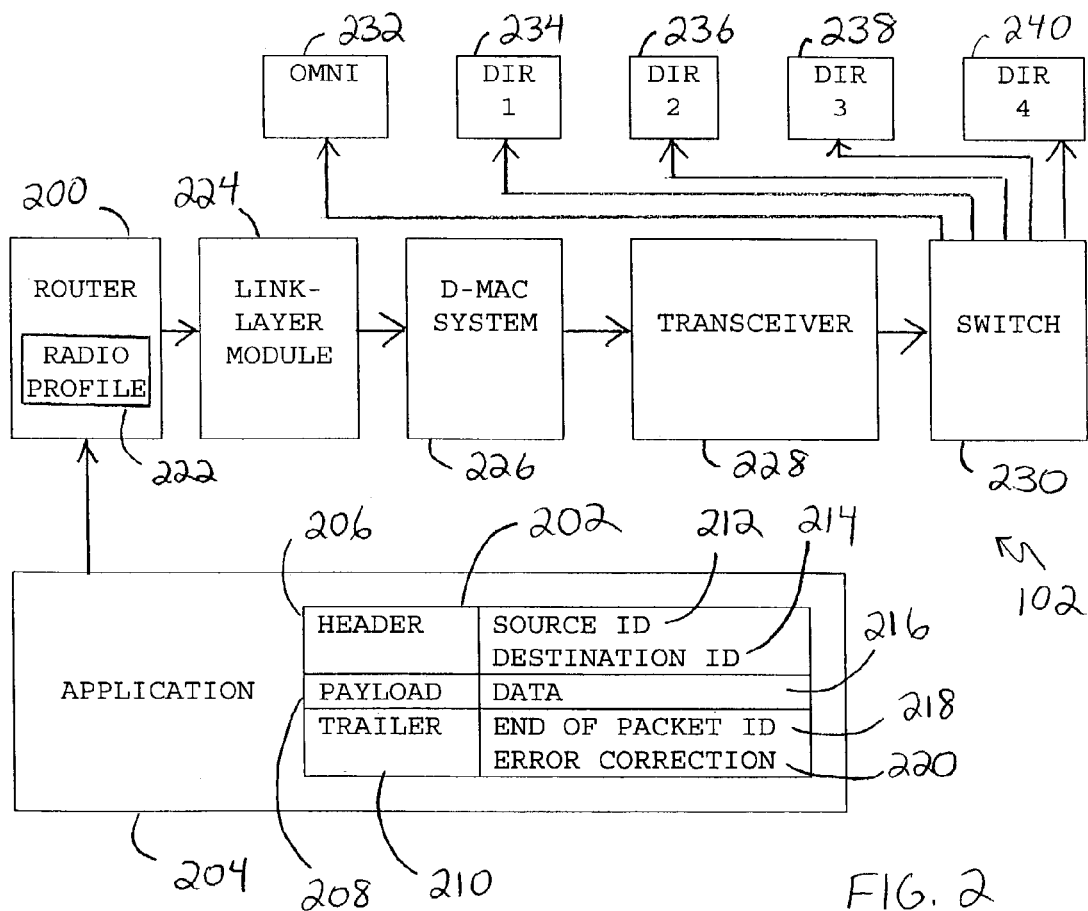
FIG. 2 shows a block diagram of a node within the wireless network.

FIG. 2 shows a block diagram of one of nodes 102 within the wireless network 100. Node 102 includes a router 200. Router 200 is a device at node 102 that is capable of forwarding data packets 202 for transmission, based on network layer information. Router 200 may also participate in running one or more network layer routing protocols in order to exchange information with other nodes 102, the information being used to allow computation of routes for the transmission of data packets 202.

Router 200 receives data packets 202, of which an exemplary one is shown, from an application 204 executed on a computing platform (not shown) in communication with router 200. The computing platform at which application 204 is executed may be integral to node 102, or separate from node 102. Through the execution of application 204, data packets 202 are generated and designated for transmission to others of nodes 102 within wireless network 100.

Data packets 202 are segments of a message that is generated via application 204. The message may be e-mail, data files, audio files, and so forth. The segments are generally configured to be a predetermined size. Data packets 202 are typically split into three parts; a header 206, a payload 208, and a trailer 210. Header 206 contains instructions about the data carried by data packets 202. Thus, header 206 may include a packet length, synchronization bits, a packet number, a source identifier 212, a destination identifier 214, and so forth. Payload 208, also known as the body or data, is actual data 216 that data packet 202 is delivering to one of nodes 102 specified by destination identifier 214. Trailer 210 typically includes an end of packet identifier 218 informing a receiving one of nodes 102 that it has reached the end of data 216. Trailer 210 may also include error correction coding 220, such as cyclic redundancy check, known to those skilled in the art.

In an exemplary embodiment, router 200 evaluates each of data packets 202 and generates a radio profile 222 specific to each data packet 202. Radio profile 222 indicates the specific radio attributes to be used for a particular transmission, including the beamforming mode (either omnidirectional or directional), transmit power, and a particular transmission mode to be used. Radio profile 222 will be discussed in further detail in connection with FIGS. 3-4.

A link layer module 224 is in communication with router 200. As known to those skilled in the art, link layer module 224 is a protocol layer that accepts data packets 202 from router 200, manages queues that may or may not be prioritized, and manages the number of retries, i.e., retransmissions, of data packets 202 upon unsuccessful transmission of data packets. Link layer module 224 is in further communication with a directional media access control (D-MAC) system 226 of the present invention. Link layer module 224 feeds data packets 202 one at a time, along with their associated radio profile 222, to D-MAC system 226 for transmission.

D-MAC system 226 is in communication with a single transceiver 228 of node 102. Transceiver 228 is coupled to an input of a switch 230, and switch 230 has outputs coupled to each of a plurality of antennas. In an exemplary embodiment, the plurality of antennas includes an omnidirectional antenna 232 and first, second, third, and fourth directional antennas 234, 236, 238, and 240, respectively.

D-MAC system 226 controls access to channels 104 in accordance with methodology described below. In general, D-MAC system 226 enables the directional transmission/reception of data packets 202 designated for point to point transmission, by selecting and switching to the one of first, second, third, and fourth directional antennas 234, 236, 238, and 240 presumed to have the maximum gain toward the receiving one of nodes 102. In addition, D-MAC system 226 enables omnidirectional transmission/reception of data packets 202 designated for broadcast transmission, by selecting and switching to omnidirectional antenna 232.

Node 102 is shown with a single omnidirectional antenna and four directional antennas for simplicity of illustration. However, it should become apparent to those skilled in the art that nodes 102 may have any number of omnidirectional and directional antennas, each of which may be selectively switched to in order to transmit or receive data packets 202.

FIG. 3

FIG. 3 shows a table of an exemplary radio profile 222 generated for one of data packets 202 to be transmitted from transmitting node 106. Discussion hereinafter will pertain to the transmission and reception of a single data packet for simplicity of illustration. Accordingly, data packets 202 will be referred to hereinafter in singular form, i.e., as data packet 202.

Radio profile 222 describes parameters indicating specific radio attributes to be passed to D-MAC system 226 that will be used for the transmission of data packet 202. Radio profile 222 is preferably a predetermined array of parameters created, and thereafter manipulated, by router 222 via standardized calls and operations. Radio profile 222 may be generated at router 200 in accordance with a data type of data 216 in data packet 202, an application type of application 204, and so forth.

Radio profile 222 may include parameters related to a beamforming mode 300, a transmission power level 302, and one of a number of transmission modes 304. In addition, radio profile 222 may contain the following parameters, or a sub-set of the following parameters, including data rate, maximum number of transmission attempts, packet priority, frequency, forward error correction (FEC) coding, and time to remain "alive" in a queue (not shown).

A desirable element in the successful implementation and deployment of network 100 is the ability to form narrow beams between nodes 102, for example, between transmitting node 106 and receiving node 108, thus achieving directional transmission. Directional transmission provides gain in the direction of communication and reduces the effects of multipath propagation. Directional transmission is particularly useful when unicast, or point-to-point, communication of data packet 202 is desired. In contrast, omnidirectional transmission may be useful when broadcast, or multicast, communication of data packets 202 intended for receipt at multiple nodes 102 is desired.

Thus, beamforming mode 300, associated with data packet 202, indicates whether a narrow beam is to be formed using one of first, second, third, and fourth antennas 234, 236, 238, and 240, respectively, to achieve directional transmission. Alternatively, beamforming mode 300, associated with data packet 202, indicates whether wide, circular coverage is to be provided using omnidirectional antenna 232. In the exemplary radio profile 222, beamforming mode 300 is "OMNI" indicating that transmission of data packet 202 is to occur from omnidirectional antenna 232. Beamforming mode 300 of "DIR" (not shown) indicates that transmission of data packet 202 is to occur from one of first, second, third, and fourth antennas 234, 236, 238, and 240. However, a particular one of antennas 234, 236, 238, and 240 is not specified in radio profile 222. The particular one of antennas 234, 236, 238, and 240 is selected through methodology executed by D-MAC system 226, discussed below.

Transmission power level 302 is a minimum power suggested by router 200 at which data packet 202 is to be transmitted from transmitting node 106. Transmission power level 302 may be adjusted through methodology executed by D-MAC system 226, discussed below.

The one of transmission modes 304 specifies how data packet 202 is to be transmitted from transmitting node 106 to receiving node 108. A particular one of transmission modes 304 defines the fundamental information exchange to take place when transmitting data packet 202. The fundamental information exchange, also known as primitives, may include request-to-send (RTS), clear-to-send (CTS), data packet 202 (DATA), and acknowledge (ACK).

As known to those skilled in the art, an RTS signal is a status request signal sent from transmitting node 106 to receiving node 108. The RTS signal is typically sent from a transmitting node to determine whether a receiving node is free to receive a data packet. As such, RTS may be considered a transmission request signal. A CTS signal is a status signal transmitted from the receiving node to the transmitting node. The CTS signal indicates that the receiving node is free to accept data packet 202 from the transmitting node. Accordingly, CTS may be considered a transmission authorization signal. An ACK signal is an acknowledgement signal transmitted from the receiving node to the transmitting node in response to successful receipt of a data packet.

In the exemplary radio profile 222, the particular one of transmission modes 304 is mode "A" indicating that transmission of data packet 202 is to occur in accordance with the fundamental information exchange of a mode "A" transmission mode, discussed in connection with FIG. 4. The transmission and receipt of data packet 202 is enabled through methodology executed by D-MAC system 226 at each of transmitting and receiving nodes 106 and 108, discussed below, in response to the one of transmission modes 304 specified in radio profile 222.

FIG. 4

FIG. 4 shows a table of transmission modes 304 used by D-MAC system 226. The desired one of transmission modes 304 is selected by router 200 using a bit field in radio profile 222 that indicates which of transmission modes 304 is to be used for data packet 202. Transmission modes 304 of the present invention indicate which of the RTS, CTS, and ACK signals are expected when transmitting data packet 202.

Transmission modes 304 include a mode "A" 400, a mode "B" 402, a mode "C" 404, and a mode "D" 406. Designators "A", "B", "C", and "D" are used herein for clarity to distinguish the four types of transmission modes 304 possible for data packet 202. Designators "A", "B", "C", and "D" will be used throughout this discussion to differentiate methodology that is executed at transmitting node 106 and receiving node 108 in response to the selected one of modes 304.

Transmission modes 304 are subdivided into two transmission categories, an unreliable category 408 and a reliable category 410. Mode A 400 and mode C 404 are included in unreliable category 408, and mode B 402 and mode D 406 are included in reliable category 410. In modes A and C 400 and 404, respectively, of unreliable category 408, router 200 is not provided with an indication of success or failure of the transmission of data packet 202. That is, no ACK signal is expected at transmitting node 106. In contrast, in modes B and D 402 and 406, respectively, of reliable category 410, router 200 is guaranteed an indication of success or failure of the transmission of data packet 202. That is, an ACK signal is expected at transmitting node 106.

Mode A 400 of unreliable category 408 further indicates that no RTS is to be sent from transmitting node 106. In this case, transmitting node 106 sends data packet 202 without any accompanying primitives (i.e., no RTS signal and no ACK request). Mode A 400 may be used for the broadcast, or multicast, of data packet 202 to be transmitted omnidirectionally from omnidirectional antenna 232.

Mode B 402 of reliable category 410 further indicates that no RTS is to be sent from transmitting node 106. However, in this case, transmitting node 106 sends data packet 202 with an accompanying primitive (i.e. an ACK request) so that receiving node 108 transmits an ACK signal following successful receipt of data packet 202. Mode B 402 may be used for small data packets 202 (below a pre-configured packet size threshold).

Mode C 404 of unreliable category 408 further indicates that an RTS is to be sent from transmitting node 106. In this case, transmitting node 106 sends an accompanying primitive (i.e., an RTS signal) prior to transmission of data packet 202. Mode C 404 may be used for directional transmission of data packet 202. That is, by sending the RTS signal prior to transmission of data packet 202, transmitting node 106 can switch to a particular one of its directional antennas 234, 236, 238, and 240 for reception of data packet 202.

Mode D 406 of reliable category 410 further indicates that both an RTS signal and an ACK request signal are to be sent from transmitting node 106. In this case, transmitting node 106 sends accompanying primitives (i.e., an RTS signal and an ACK request) prior to transmission of data packet 202. In response to the RTS signal and the ACK request of mode D 406, receiving node 108 will transmit a CTS signal when receiving node 108 is free to accept data packet 202 from transmitting node 106. In addition, receiving node 108 will transmit an ACK signal following successful receipt of data packet 202. Mode D 406 may be used for all but small data packets 202 (above a pre-configured packet size threshold) that are intended for directional transmission, such as in unicast, or point-to-point, applications.

FIG. 5

Figure 5:
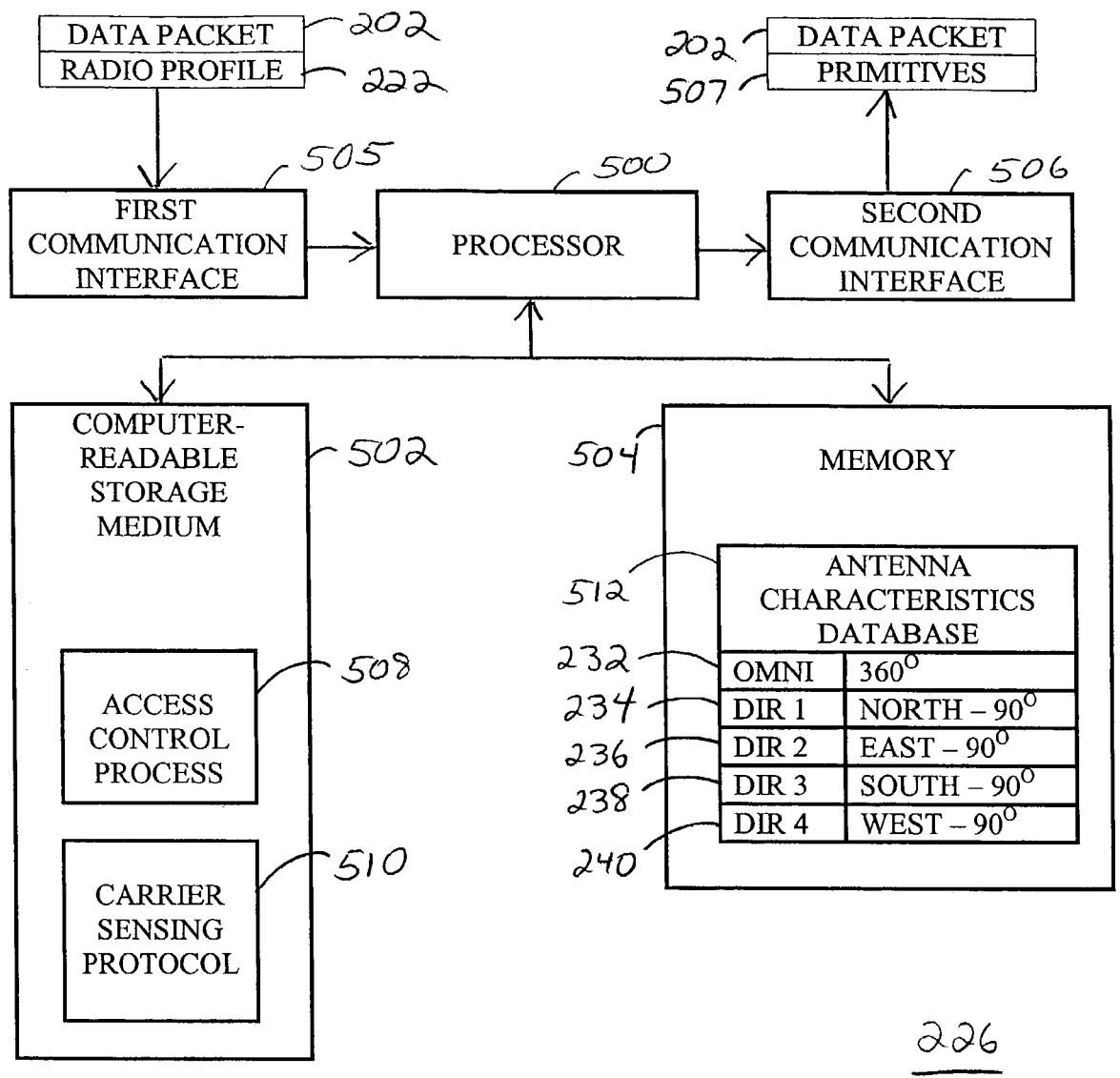
FIG. 5 shows a simplified block diagram of a directional medium access control (D-MAC) system implemented at each of the nodes within FIG. 1 in accordance with a preferred embodiment of the present invention.

FIG. 5 shows a simplified block diagram of directional medium access control (D-MAC) system 226 implemented at each of nodes 102 within wireless network 100. D-MAC system 226 functions to control access to channels 104 of wireless network 100 in accordance with a preferred embodiment of the present invention. The operation of D-MAC system 226 is based on carrier sense multiple access with collision avoidance (CSMA/CA). The conventional CSMA/CA approach is a protocol that involves desisting-transmission when the transmission medium is sensed as being busy. The conventional CSMA/CA protocol calls for initiating random backoff periods to avoid collisions with transmissions from other nodes in a network. The operation of D-MAC system 226 is a significant variant of CSMA/CA, the variations resulting from the different constraints and opportunities with regard to omnidirectional antenna 232 and directional antennas 234, 236, 238, and 240 utilized at each of nodes 102.

D-MAC system 226 generally includes a processor 500 on which methods according to the invention can be practiced. Processor 500 is in communication with a computer-readable storage medium 502 and a memory 504. Processor 500 is further in communication with a first communication interface 505 having an input for receiving data packet 202 and radio profile 222 from link-layer module 224. In addition, processor 500 is in communication with a second communication interface 506 having an output for passing data packet 202, and any associated primitives (RTS, ACK)-507 specified by a particular one of transmission modes 304 selected for data packet 202, to transceiver 228 for transmission over channels 104. Those skilled in the art will appreciate that additional components and connections may be utilized in a particular D-MAC system 226 in accordance with conventional network device architectures.

Computer-readable storage medium 502 encompasses executable code in the form of an access control process 508. Access control process 508 is a protocol or computer program residing upon computer-readable medium 502 that instructs processor 500 to control access to the transmission medium (i.e. channels 104) in accordance with preferred embodiments of the present invention. Computer-readable storage medium 502 further encompasses a carrier sensing protocol 510 employed by access control process 508 to detect if another of nodes 102 is transmitting.

Those skilled in the art will appreciate that, for the purposes of this discussion, computer-readable storage medium 502 may be implemented in central processing unit (CPU) microcode and/or include cooperating or interconnected computer readable media, which exist exclusively on D-MAC system 226 or are distributed among multiple interconnected computer systems (not shown) within node 102. Alternatively, computer-readable storage medium 502 may be a hard disk, a magnetic disk, compact disk, or any other volatile or non-volatile mass storage system readable by processor 500. The use of any medium or combination of media particular to the past, the present, or the future as computer-readable storage medium 502 does not depart from the spirit of the present invention.

Memory 504 contains an antenna characteristics database 512. Antenna characteristics database 512 is accessed through the execution of access control process 508 to select a particular one of omnidirectional antenna 232 and first, second, third, and fourth antennas 234, 236, 238, and 240 best suited for transmission or reception of data packet 202. In particular, through the methodology of process 508, D-MAC system 226 maps a given node address, for example, destination identifier 214 to one of antennas 232, 234, 236, 238, and 240.

Those skilled in the art will appreciate that access control process 508 contains a plurality of routines, or modules. Each of these routines is configured to perform a particular task or process. These tasks and processes are depicted in the flowcharts of FIGS. 6-8, 10-11, 13, 15, and 17-22.

FIG. 6

Figure 6:
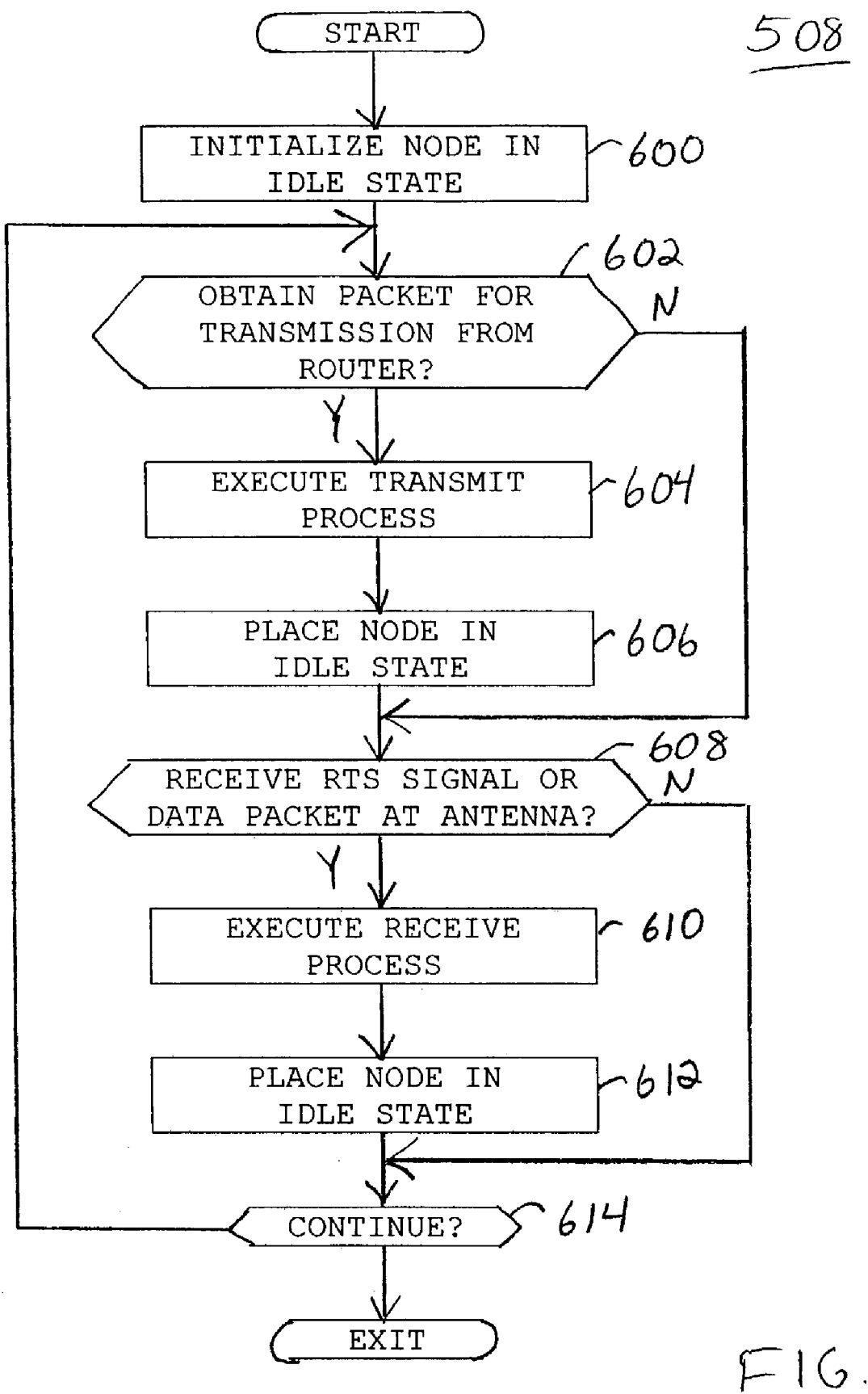
FIG. 6 shows a flowchart of an access control process executed by the D-MAC system of FIG. 5.

FIG. 6 shows a flowchart of access control process 508 executed by D-MAC system 226 at each of nodes 102. Access control process 508 enables access to the transmission media, i.e. channels 104, to provide for reliable transfer of data packet 202, while undesirable situations in which one packet arrives before an earlier packet is completely received, thus resulting in an unsuccessful reception of the earlier packet.

Process 508 begins with a task 600. Task 600 initializes D-MAC system 226 in an idle state. For purposes of the following description, this idle state will be referred to hereinafter as a "natural idle state". In the natural idle state, D-MAC system 226 has no packets to transmit. Rather, D-MAC system 226 is simply waiting for a communication event. This communication event includes initiating data packet transmission, as well as receiving data packets from other nodes.

The natural idle state differs from a "forced idle state" of the present invention. The forced idle state is entered when D-MAC system 226 has something to send, but is forced by process 508 to desist. When in the forced idle state, D-MAC system 226 may receive and respond to primitives (RTS/CTS/ACK), but cannot initiate transmission of data packet 202. The forced idle state serves two purposes. The first purpose is to guarantee a minimum amount of time that node 102 is not transmitting, in order for other nodes 102 to send to it. The second purpose is that by backing off when an expected response is not obtained, the offered load to the network can be controlled, thereby establishing a stable protocol. The forced idle state is followed by the natural idle state.

The amount of time spent in the forced idle state depends upon the reasons that node 102 entered the forced idle state. The reasons that the forced idle state may be entered are 1) channel 104 is busy in response to carrier sensing, 2) no CTS is received, 3) no ACK is received, and 4) upon successful completion of transmission of data packet 202. These reasons, and the associated tasks pertaining to these reasons, will be described in greater detail below.

Throughout the execution of process 508, whenever node 102 is placed in either of the natural idle and the forced idle states, D-MAC system 226 selects omnidirectional antenna 232 and enables switch 230 to switch to omnidirectional antenna 232. Consequently, in both of the natural idle and forced idle states, transceiver 228 is interconnected with omnidirectional 232, thus enabling node 102 to "listen" for communication events from others of nodes 102.

Once D-MAC system 226 is initialized in the natural idle state, then a query task 602 determines whether data packet 202 is obtained for transmission from router 200 via link-layer module 224. Query task 602 may make such a determination by examining a buffer or queue for the presence of one or more data packets 202. Alternatively, query task 602 may make such a determination in response to signaling from link-layer module 224.

When at query task 602, data packet 202 is obtained for transmission, a task 604 initiates the execution of a transmit process. The transmit process will be described in detail in connection with FIGS. 7-16. Following task 604, a task 606 places node 102 in the natural idle state. That is, switching is effected to connect transceiver 228 to omnidirectional antenna 232.

Following task 606, or when query task 602 determines that data packet 202 is not obtained for transmission, process flow proceeds to a query task 608. Query task 608 determines whether a transmission request (RTS signal) or another of data packets 202 (transmitted from another of nodes 102) is detected at the currently tuned to antenna, i.e., omnidirectional antenna 232.

When query task 608 detects receipt of either an RTS signal or another of data packets 202, a task 610 is performed. Task 610 initiates the execution of a receive process. The receive process will be described in detail in connection with FIGS. 18-22. Following task 610, a task 612 places node 102 in the natural idle state if node 102 was in the natural idle state when query task 608 detected receipt of either an RTS signal or another of data packets 202. Alternatively, if node 102 was in a forced idle state when query task 608 detected receipt of either an RTS signal or another of data packets 202, task 612 places node 102 in the forced idle state. In either instance, switching is effected to connect transceiver 228 with omnidirectional antenna 232.

Following task 612, or when query task 608 determines that receipt of an RTS signal or another of data packets 202 is not detected at omnidirectional antenna 232, process flow proceeds to a query task 614. Query task 614 determines whether the execution of access control process 508 is to continue. When the execution of process 508 is to continue, program control loops back to query task 602 to continue monitoring for data packets 202 to be transmitted and to continue to listen for the receipt of RTS signals and other data packets 202 from other nodes 102 at the receiving antenna, i.e., omnidirectional antenna 232. When the execution of process 508 is to be discontinued, process 508 exits. Through the continuous execution of process 508, node 102 is periodically enabled to transmit and receive data packets 202 using omnidirectional antenna 232 and any of directional antennas 234, 236, 238, and 240.

Query tasks 602 and 608, and subsequent tasks performed in response to the outcome of either of tasks 602 and 608 are described as serial activities within the flowchart of access control process 508 for simplicity of illustration. However, it should be understood that obtaining query task 602 and detecting query task 608 occur concurrently at D-MAC system 226. That is, D-MAC system 226 may obtain data packet 202 for transmission and concurrently detect receipt of an RTS signal or another of data packets 202 at omnidirectional antenna 232. Timing and carrier sensing activities of the below described routines enable switching between omnidirectional antenna 232 and any of directional antennas 234, 236, 238, and 240 for the appropriate transmission and/or reception of information.

FIG. 7

Figure 7:
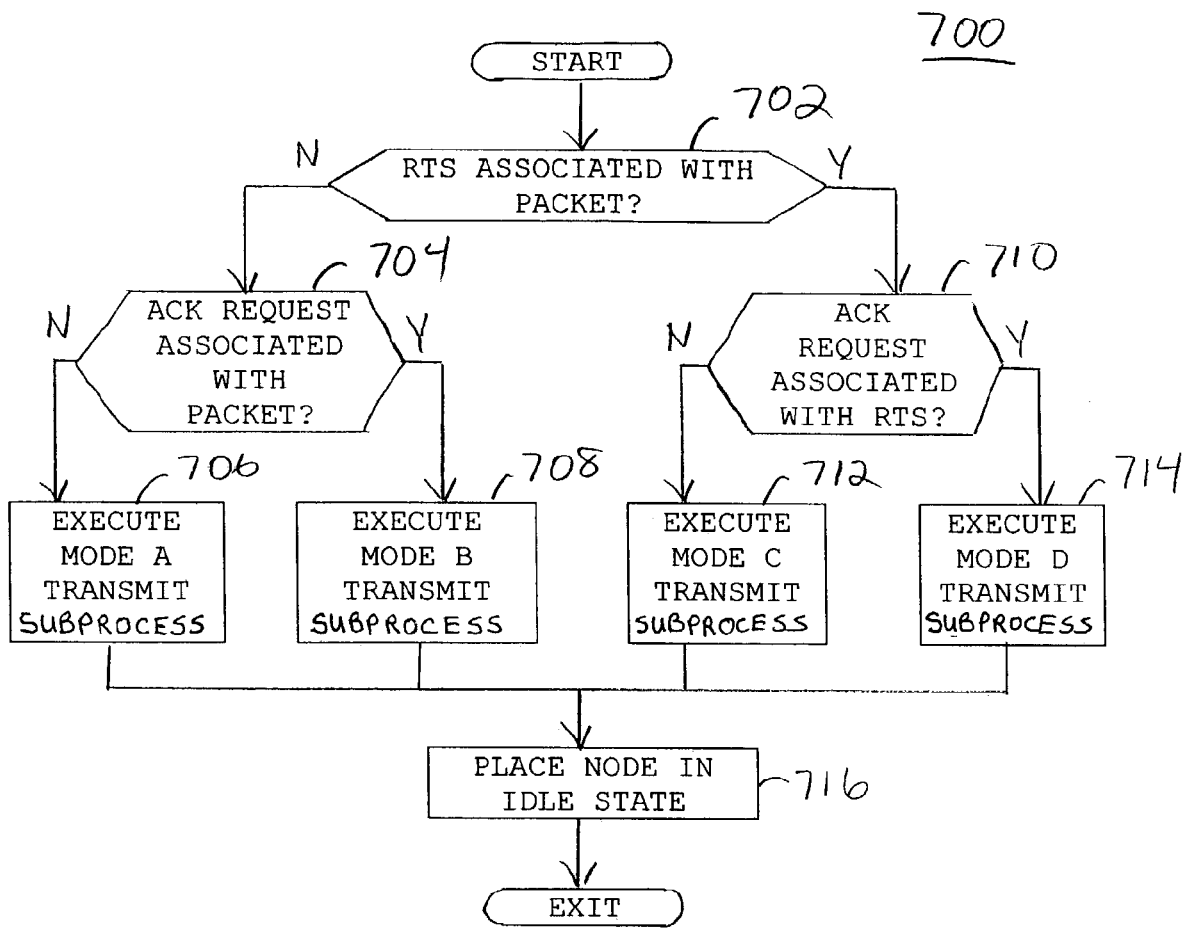
FIG. 7 shows a flowchart of a transmit process of the access control process of FIG. 6.

FIG. 7 shows a flowchart of a transmit process 700 of access control process 508. When data packet 202 is obtained from router 200 via link-layer module 224, task 604 of access control process 508 causes the execution of transmit process 700. In general, transmit process 700 manages the transmission of data packet 202 in accordance with information content contained in radio profile 222 associated with data packet 202. More specifically, transmit process 700 evaluates beamforming mode 300, transmission power level 302, and transmission mode 304 to control the selection of antennas, access to channels 104, and transmit power for data packet 202.

The activities associated with each of the four transmission modes 304 are described separately herein for clarity of illustration. In addition, for purposes of illustration, transmit process 700 is described as being initiated at transmitting node 106, while the intended receiving one of nodes 102 is receiving node 108.

Transmit process 700 begins at a query task 702. At query task 702, processor 500 of D-MAC system 226 evaluates radio profile 222 associated with data packet 202 to determine whether an RTS, i.e., a transmission request signal, is associated with data packet 202. When an RTS is not associated with data packet 202, program control proceeds to a query task 704.

Query task 704 evaluates radio profile 222 associated with data packet 202 to determine whether an ACK request is associated with data packet 202. When query task 704 determines that an ACK request is not associated with data packet 202, transmit process 700 proceeds to a task 706. Conversely, when query task 704 determines that an ACK request is associated with data packet 202, transmit process 700 proceeds to a task 708.

A positive response at query task 702, indicating that an RTS is associated with data packet 202, initiates similar radio profile 222 evaluation activities. That is, when query task 702 determines that an RTS is associated with data packet 202, program control proceeds to a query task 710.

Query task 710 evaluates radio profile 222 associated with data packet 202 to determine whether an ACK request is associated with data packet 202 and the RTS. When query task 710 determines that an ACK request is not associated with data packet 202, transmit process 700 proceeds to a task 712. Conversely, when query task 710 determines that an ACK request is associated with data packet 202 and the RTS, transmit process 700 proceeds to a task 714.

Through the execution of query tasks 702, 704, and 710, D-MAC system 226 readily ascertains the one of transmission modes 304 associated with data packet 202, the transmission modes 304 being mode A 400 (no RTS, no ACK), mode B 402 (ACK only), mode C 404 (RTS only), and mode D 406 (RTS, ACK). The presence or absence of primitives 507, RTS and ACK, define how data packet 202 is to be transmitted.

Consequently, a negative response to each of query tasks 702 and 704 results in the determination of mode A 400 being associated with data packet 202. Thus, task 706 causes the execution of a mode A transmit subprocess, described in connection with FIG. 8. Similarly, a negative response to query task 702 and a positive response to query task 704 results in the determination of mode B 402 being associated with data packet 202. Thus, task 708 causes the execution of a mode B transmit subprocess, described in connection with FIG. 11.

A positive response to query task 702 and a negative response to query task 710 results in the determination of mode C 404 being associated with data packet 202. Thus, task 712 causes the execution of a mode C transmit subprocess, described in connection with FIG. 13. A positive response to each of query tasks 702 and 710 results in the determination of mode D 406 being associated with data packet 202. Thus, task 714 causes the execution of a mode D transmit subprocess, described in connection with FIG. 15. Those skilled in the art will appreciate that query tasks 702, 704, and 710 may be combined into a single query activity that identifies which of transmission modes 304 is associated with data packet 202 so that the appropriate transmit subprocess, based upon transmission modes 304, may be executed.

Following any of tasks 706, 708, 712, and 714, transmit process 700 proceeds to a task 716. Task 716 causes transmitting node 106 to return to the natural idle state until another communication event, in the form of initiating data packet transmission or receiving data packets from others of nodes 102, is detected. Following task 716, process 700 exits.

FIG. 8

Figure 8:
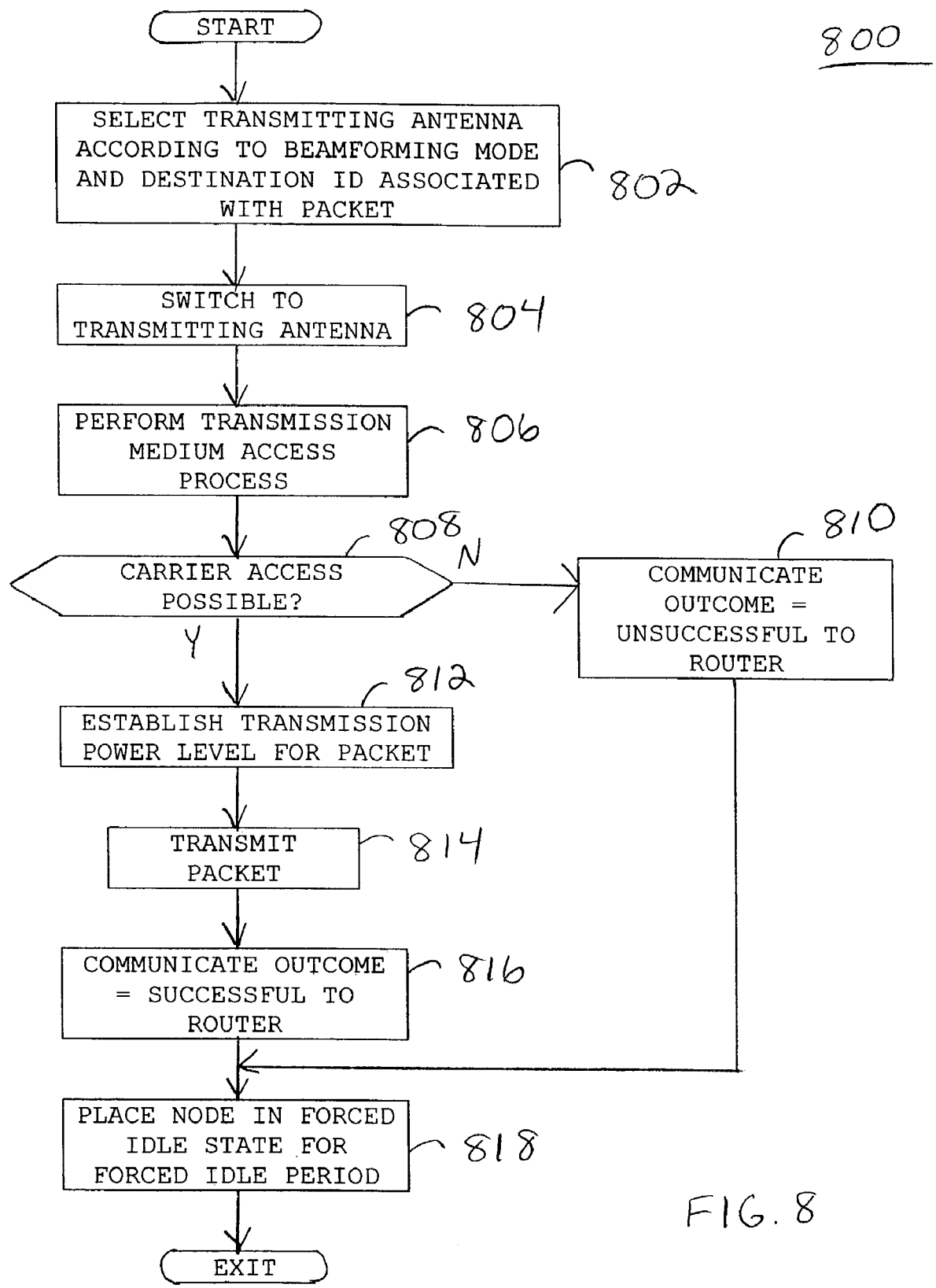
FIG. 8 shows a flowchart of a mode "A" transmit subprocess of the transmit process of FIG. 7.

FIG. 8 shows a flowchart of a mode A transmit subprocess 800 of transmit process 700. In general, mode A transmit subprocess 800 sets forth the operations executed by processor 500 of D-MAC system 226 when the one of transmission modes 304 associated with data packet is mode A 400 (no RTS, no ACK).

Mode A transmit subprocess 80.0 begins with a task 802. Task 802 selects a transmitting antenna from omnidirectional antenna 232 and directional antennas 234, 236, 238, and 240 according to beamforming mode 300 and destination identifier 214 of data packet 202.

In an exemplary scenario, beamforming mode 300 is DIR, indicating a directional one of antennas 232, 234, 236, 238, and 240 is desired. Task 802 then causes processor 500 to access antenna characteristics database 512 to select one of first, second, third, and fourth directional antennas 234, 236, 238, and 240 best suited for transmission of data packet 202 to receiving node 108, according to destination identifier of receiving node 108. In this exemplary scenario, task 802 selects second directional antenna 236 to be a transmitting antenna. Accordingly, throughout the discussion of mode A transmit subprocess 800, second directional antenna 236 is referred to as transmitting antenna 236.

Although transmitting antenna 236 is a directional antenna, it should be understood that beamforming mode 300 may indicate that data packet 202 is to be transmitted from omnidirectional antenna 232. In such an instance, omnidirectional antenna 232 may be selected as the transmitting antenna. Regardless, the following activities of mode A transmit subprocess 800 apply. Similarly, omnidirectional antenna 232 or any of directional antennas 234, 236, 238, and 240 may be selected as the transmitting antenna for any of the mode B, mode C, mode D transmit subprocesses of FIGS. 11, 13, and 15.

Following task 802, a task 804 enables the activation of switch 230 to switch from omnidirectional antenna 232 to transmitting antenna 236. Of course, if the transmitting antenna is omnidirectional antenna 232, task 804 merely verifies that transmitting node 106 is currently switched to omnidirectional antenna 232.

Next, a task 806 causes the execution of a transmission medium access process. The transmission medium access process determines whether the transmission medium, i.e., channel 104, is free in the beam direction of transmitting antenna 236. The transmission medium-access process is described in detail in connection with FIG. 10. The result of the execution of transmission medium access process is the eventual determination that either channel 104 is free or access to channel 104 is impossible.

Following the execution of the transmission medium access process of FIG. 10 at task 806, mode A transmit process 800 proceeds to a query task 808. Query task 808 assesses the results of the execution of the transmission medium access process to determine whether carrier access is possible. When access to channel 104 in the beam direction of transmitting antenna 236 is not possible, process 800 proceeds to a task 810. Access to channel 104 may not be possible, if for any reason, the transmission medium (channel 104) never becomes free. Such an instance is unlikely, but not impossible, if channel 104 becomes jammed with transmissions from other nodes 102, or from a hostile party.

Task 810 communicates an unsuccessful outcome indication of the transmission attempt to router 200 via link-layer module 224. Link-layer module 224 may subsequently either re-initiate transmission of data packet 202 or abort the transmission of data packet 202.

When query task 808 determines that access to channel 104 in the beam direction of transmitting antenna 236 is possible, process 800 proceeds to a task 812. Task 812 causes D-MAC system 226 to establish a transmission power level for data packet 202. D-MAC system 226 has no power control for mode A 400, mode B 402, and mode C 404 transmission modes 304. As such, task 812 establishes the transmission power level for data packet 202 from transmitting antenna to be transmission power level 302 suggested within radio profile 222.

Following task 812, a task 814 enables the transmission of data packet 202 from transmitting antenna 236 over channel 104 toward receiving node 108. Receiving activities associated with mode A 400 that are performed at receiving node 108 are discussed in connection with FIG. 19.

A task 816, following task 814, causes D-MAC system 226 to communicate a successful outcome indication of the transmission of data packet 202 to router 200 via link-layer module 224. Following either of communication task 810 (indicating an unsuccessful transmission of data packet 202) and communication task 816 (indicating a successful transmission of data packet 202), mode A transmit subprocess 800 proceeds to a task 818.

Task 818 places transmitting node 106 in a forced idle state for a forced idle period. The forced idle period provides spacing, i.e., a contention window, between consecutive transmissions in order to allow other nodes 102 to send to transmitting node 106. The forced idle period may be computed in accordance with the following procedure.

Resetting Forced Idle Period when ACK not Expected or Upon ACK Reception

LowFI=INTER-DATA-FI-LOW-INIT

HiFI=max(HiFI/2,INTER-DATA-FI-HIGH-MIN)

where in an exemplary configuration,
INTER-DATA-FI-LOW-INIT=8000 μsec
INTER-DATA-FI-HIGH-MIN=8000 μsec
Current-FI-period=uniform-random(LowFI, HiFI)

The exemplary values for INTER-DATA-FI-LOW-INIT and INTER-DATA-FI-HIGH-MIN represent at least the size of data packet 202. In an exemplary embodiment, the Current-FI-period implements an "exponential decrease" of the contention window, subject to a minimum value (configured parameter INTER-DATA-FI-HIGH-MIN).

As discussed earlier, when transmitting node is placed in the forced idle state, D-MAC system 226 selects and effects switching from transmitting antenna 236 to omnidirectional antenna 232. Of course, if the transmitting antenna is omnidirectional antenna 232, task 818 merely verifies that transmitting node 106 is currently switched to omnidirectional antenna 232. Following expiration of the forced idle period (Current-FI-period) computed at task 818, process 800 exits.

FIG. 9

FIG. 9 shows a state diagram 900 of data packet transmission and reception activities between transmitting (TX) node 106 and receiving (RX) node 108 relative to time in response to the execution of mode A transmit subprocess 800. As shown, transmitting node 106 is initially in a natural idle state 902. At a start time, $T_S$, transmitting node 106 begins a data transmission period 904 during which data packet 202 is transmitted. Following the completion of data packet 202 transmission, at an end time, $T_E$, transmitting node 106 enters a forced idle state 906. Following expiration of forced idle period (Current-FI-period) computed at task 818, at $T_{FI}$, transmitting node 106 returns to natural idle state 902.

Cross-hatching used within the state diagrams of FIGS. 9, 12, 14, and 16 is used to represent information that may be received at either of transmitting and receiving nodes 106 and 108, respectively, from the other of nodes 106 and 108 in accordance with the selected one of transmission modes 304. In contrast, an absence of cross-hatching used within the state diagrams of FIGS. 9, 12, 14, and 16 is used to represent information that may be transmitted from either of transmitting and receiving nodes 106 and 108, respectively, to the other of nodes 106 and 108 in accordance with the selected one of transmission modes 304.

As further shown in state diagram 900, when receiving node 108 is in an idle state 908 (which may be either natural idle or forced idle), receiving node 108 may receive data packet 202. For example, at a detection time, $T_D$, receiving node 108 begins receiving data packet 202. During a data receipt period 910, receiving node 108 receives data packet 202, until receipt of data packet 202 is completed at a completion time, $T_C$. Following receipt of data packet 202, receiving node 108 returns to idle state 908.

State diagram 900 illustrates the desired transmission and subsequent reception activities for data packet 202. Since transmitting and receiving nodes 106 and 108, respectively, are not exchanging primitives (RTS, CTS, and ACK), receiving node 108 may or may not actually receive data packet 202. That is, receiving node 108 is unaware of the impending transmission of data packet 202 from transmitting node 106. Furthermore, transmitting node 106 is unaware of an unsuccessful receipt of data packet 202 at receiving node 108.

FIG. 10

FIG. 10 shows a flowchart of a medium access subprocess 1000 implemented through the execution of access control process 508. As discussed previously in connection with task 806 of mode A transmit subprocess 800, medium access subprocess 1000 is executed to determine the availability of the transmission medium, i.e., channel 104, for transmitting data packet 202. Medium access subprocess 1000 is also executed in tasks associated with mode B, mode C, and mode D transmit subprocesses, discussed below in connection with FIGS. 11, 13, and 15.

Medium access subprocess 1000 is executed to gain access to the transmission medium, i.e., channel 104, so as to transmit data packet 202. Medium access subprocess 1000 performs carrier sensing activities to determine whether channel 104 is free in the beam direction of transmitting antenna 236. The expression "directional carrier sensing" as employed herein, refers to performing carrier sensing activities via carrier sensing protocol 510 at one of omnidirectional antenna 232 and directional antennas 234, 236, 238, and 240.

Medium access subprocess 1000 begins with a task 1002. Task 1002 sets a retry counter equal to zero. The retry counter is used to count a number times, up to a maximum number of retry attempts, that carrier sensing is performed at transmitting antenna 236.

A task 1003 is performed in connection with task 1002. Task 1003 starts a carrier access timer. The carrier access timer is used to limit the duration of time during which processor 500 attempts to access channel 104. Once started, carrier access timer may decrement until either channel 104 is successfully accessed or until the timer expires and subprocess 1000 is forced to discontinue attempts to access channel 104.

Following task 1003, a task 1004 is performed. Task 1004 causes processor 500 to execute carrier sensing protocol 510 on transmitting antenna 236 in order to determine the availability of channel 104. Carrier sensing protocol 510 senses the availability of channel 104 at transmitting antenna 236 for a carrier sensing period. The carrier sensing period may be a randomly chosen value between a DCS-MIN and DCS-MAX, each of which is a predetermined parameter. In an exemplary embodiment, DCS-MIN may be 200 μsec, and DCS-MAX may be 250 μsec.

In response to directional carrier sensing at task 1004, a query task 1006 determines whether channel 104 is free for the duration of the carrier sensing period. When channel 104 is free, subprocess 1000 exits, at which time program control returns to the subprocess from which medium access process 1000 was called. For example, task 806 of mode A transmit subprocess 800 resulted in the initiation of subprocess 1000. As such, upon exiting medium access subprocess 1000, program control returns to query task 808 of mode A transmit subprocess 800.

When query task 1006 determines that channel 104 is not free for the duration of the carrier sensing period, medium access subprocess 1000 proceeds to a task 1008. Task 1008 increments the retry count by one.

A query task 1010 performed in connection with task 1008 then determines whether the retry count is greater than the maximum allowable retries. In an exemplary embodiment, the maximum allowable retries (MAX-CS-RETRIES) may be set at ten. MAX-CS-RETRIES is a configured parameter that controls the number of attempts before becoming "persistent", discussed below. Accordingly, query task 1010 may be represented as follows:

Force-sending=FALSE, if number-of-attempts<=MAX-CS-RETRIES

=TRUE, if number-of-attempts>MAX-CS-RETRIES where in an exemplary configuration,
number-of-attempts=retry count
MAX-CS-RETRIES=maximum allowable retries=10

When the retry count is less than or equal to the maximum allowable retries, program control proceeds to a task 1012. At task 1012, transmitting node 106 is placed in the forced idle state for a forced idle period at which time switching is effected to switch from transmitting antenna 236 to omnidirectional antenna 232. The forced idle period (Current-FI-period) may be computed in accordance with the following procedure.

Resetting Forced Idle Period Upon Channel Busy

Current-FI-period=uniform-random(INTER-CS-FI-LOW,INTER-CS-FI-HIGH)

where in an exemplary configuration,
INTER-CS-FI-LOW=440 µsec
INTER-CS-FI-HIGH=460 µsec INTER-CS-FI-LOW and INTER-CS-FI-HIGH are configured variables representing the contention window. Current-FI-period is reset in accordance with an exemplary embodiment. Alternative strategies that may be employed that include, for example, not changing the variables at all, or decreasing the contention window in inverse proportion to the retry count.

Following expiration of the forced idle period at task 1012 and after completing any communications taking place while in the forced idle period (i.e. receiving data packets, responding to RTS, and so forth), a task 1014 effects switching from omnidirectional antenna 232 back to transmitting antenna 236. Subprocess 1000 then loops back to task 1004 to again perform directional carrier sensing.

When query task 1010 determines that the retry count is greater than the maximum allowable retries, program control proceeds to a task 1016. Beginning with task 1016, D-MAC system 226 adopts a persistent state. As such, task 1016 causes transmitting node 106 to remain switched to transmitting antenna 236.

A task 1018 is performed in connection with task 1016. At task 1018, directional carrier sensing is performed. A query task 1020 determines whether the transmission medium, i.e. channel 104, is free for a carrier sensing period. When query task 1020 determines that channel 104 is free for the entire duration of the carrier sensing period, subprocess 1000 exits.

Program control than returns to the subprocess from which medium access process 1000 was called, and transmitting node 106 immediately transmits the RTS or data packet 2002, as the modality dictates. For example, task 806 of mode A transmit subprocess 800 resulted in the initiation of subprocess 1000. As such, upon exiting medium access subprocess 1000, program control returns to query task 808 of mode A transmit subprocess 800, and data packet 2002 is immediately transmitted.

When query task 1020 determines that channel 104 is not free for the entire duration of the carrier sensing period, a query task 1022 is performed to determine whether the carrier access timer has expired. That is, the carrier access timer started at task 1003 is monitored. If query task 1022 determines that the carrier access timer has not expired, program control loops back to task 1018 to once again perform directional carrier sensing to determine whether wireless link is free for a carrier sensing duration. However, when query task 1022 determines that the carrier access timer has expired subprocess 1000 exits. Accordingly, when a node is "stuck", i.e., not able to transmit even in a persistent mode, access attempts desist after expiration of the carrier access timer, and a report of an unsuccessful transmission attempt is reported to router 200.

The process of randomly sampling channel 104 for a number of attempts (i.e., retry count), and then becoming persistent thereafter essentially increases the relative priority of transmitting data packet 202, the transmission of which has been thwarted for an undesirably long time.

FIG. 11

Figure 11:
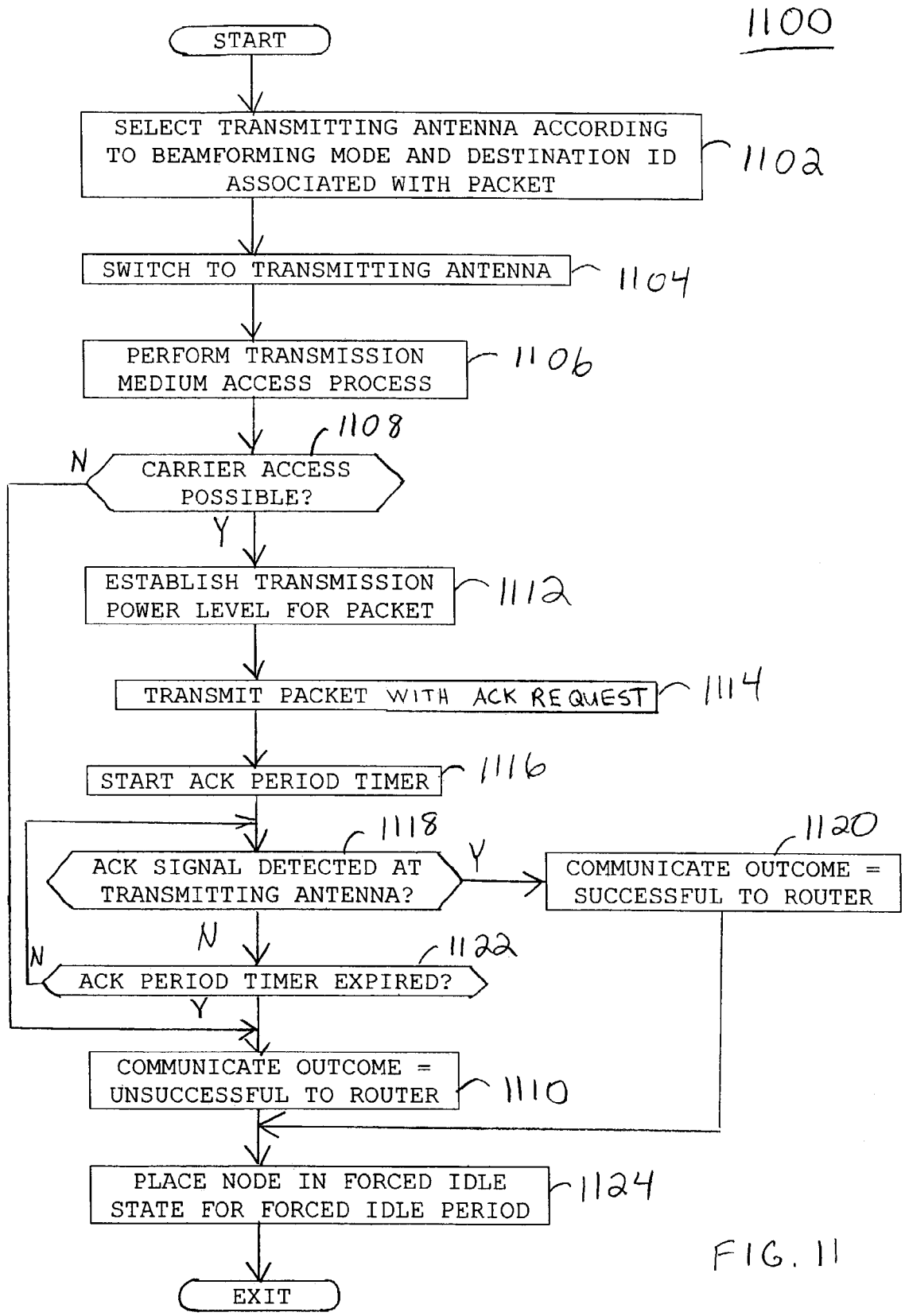
FIG. 11 shows a flowchart of a mode "B" transmit subprocess of the transmit process of FIG. 7.

FIG. 11 shows a flowchart of a mode "B" transmit subprocess 1100 of transmit process 700. In general, mode B transmit subprocess 1100 sets forth the operations executed by processor 500 of D-MAC system 226 when the one of transmission modes 304 associated with data packet 200 is mode B 402 (ACK only). Several of the tasks executed within mode B transmit subprocess 1100 are similar to those described in connection with mode A transmit subprocess 800. For brevity, tasks within subprocess 1100 that are similar to those described in detail in subprocess 800 will receive cursory discussion below. However, those tasks that distinguish mode B transmit subprocess 1100 from the other transmit subprocesses, for example, mode A transmit subprocess 800, will be described in detail.

Mode B transmit subprocess 1100 begins with a task 1102. Task 1102 selects a transmitting antenna from omnidirectional antenna 232 and directional antennas 234, 236, 238, and 240 according to beamforming mode 300 and destination identifier 214 of data packet 202. Next, a task 1104 is performed to effect switching from omnidirectional antenna 232 to a transmitting antenna. A task 1106 then initiates performance of transmission medium access process 1000. Thus, tasks 1102, 1104, and 1106 are the same as tasks 802, 804, and 806 of mode A transmit subprocess 800. For purposes of illustration, the same example shall be employed as that discussed in connection with mode A transmit subprocess 800. Accordingly, throughout the discussion of mode B transmit subprocess 1100, second directional antenna 236 is referred to as transmitting antenna 236.

Following the execution of transmission medium access process 1000 at task 1106, a query task 1108 assesses the results of the execution of the transmission medium access process to determine whether carrier access is possible. Query task 1108 is equivalent to task 808 of subprocess 800. When access to channel 104 in the beam direction of transmitting antenna 236 is not possible, process 1100 proceeds to a task 1110. Task 1110 communicates an unsuccessful outcome indication of the transmission attempt to router 200 via link-layer module 224.

When query task 1108 determines that access to channel 104 in the beam direction of transmitting antenna 236 is possible, subprocess 1100 proceeds to a task 1112. Task 1112 is equivalent to task 808 of subprocesses 800. As such, task 1112 establishes the transmission power level for data packet 202 from transmitting antenna to be transmission power level 302 within radio profile 222.

Following task 1112, a task 1114 enables the transmission of data packet 202 from transmitting antenna 236 over channel 104 toward receiving node 108. Task 1114 is distinguished from task 814 in that an ACK request is transmitted in association with data packet 202. This ACK request informs receiving node 108 that an acknowledge signal, i.e., ACK, is to be sent from receiving node 108 upon successful reception of data packet 2002. Receiving activities associated with mode B 402 that are performed at receiving node 108 are discussed in connection with FIG. 20.

A task 1116 is performed in connection with task 1114. Task 1116 starts an ACK period timer at transmitting node 106. The ACK period timer desirably includes the expected roundtrip propagation delay, the transmit/receive turnaround, and the processing time at each of transmitting and receiving nodes 106 and 108, respectively.

Once task 1116 starts the ACK period timer, transmitting node 106 awaits an ACK signal from receiving node 108. Thus, a query task 1118, determines at a given instant whether an ACK signal is detected at transmitting antenna 236 of transmitting node 106. When the ACK signal is detected, indicating that receiving node 108 successfully received data packet 202, program control proceeds to a task 1120 where D-MAC system 226 communicates to router 200, via link-layer module 224, a successful outcome indication of the transmission of data packet 202.

When query task 1118 determines that the ACK signal is not detected at transmitting node 106, subprocess 1100 proceeds to a query task 1122. Query task 1122 determines whether the ACK period timer is expired, when the ACK period timer is not expired, program control loops back to query task 1118 so that at a later instant, D-MAC system 226 can determine whether the ACK signal is detected. However, when the ACK period timer expires without detection of the ACK signal, process flow proceeds to task 1110 where D-MAC system 226 communicates an unsuccessful outcome indication of the transmission attempt to router 200 via link-layer module 224.

Following either of communication task 1110 (indicating an unsuccessful transmission of data packet 202) and communication task 1120 (indicating a successful transmission of data packet 202), mode B transmit subprocess 1100 proceeds to a task 1124.

Task 1124 places transmitting node 106 in a forced idle state for a forced idle period. In the case when data packet 202 has been successfully transmitted, i.e., following task 1120, the objective is to provide spacing, i.e., a contention window, between consecutive transmissions in order to allow other nodes 102 to send to transmitting node 106. Accordingly, the forced idle period may be set as described in connection with task 818. That is, the forced idle period may be computed in accordance with the procedure labeled Resetting Forced Idle Period When ACK Not Expected Or Upon ACK Reception.

In the case when data packet 202 has not been successfully transmitted, i.e., following task 1110, data packet 202 or the ACK signal collided with other traffic on channel 104. Thus, the objective is to spread the communication traffic out. The forced idle period (Current-FI-period) may be computed in accordance with the following procedure.

Resetting Forced Idle Period Upon No ACK Reception

LowFI=0

HiFI=min(HiFI*2,INTER-DATA-FI-HIGH-MAX)

where in an exemplary configuration,
INTER-DATA-FI-HIGH-MAX=40000 µSEC
Current-FI-period=uniform-random(LowFI, HiFI)

In an exemplary embodiment, Current-FI-period implements an "exponential increase" of the contention window, subject to a maximum value (INTER-DATA-FI-HIGH-MAX). Following expiration of the forced idle period (Current-FI-period) computed at task 1124, process 1100 exits.

FIG. 12

FIG. 12 shows a state diagram 1200 of data packet transmission and reception activities between transmitting (TX) node 106 and receiving (RX) node 108 relative to time in response to the execution of mode B transmit subprocess 1100. As shown, transmitting node 106 is initially in a natural idle state 1202. At a start time, $T_S$, transmitting node 106 begins a data transmission period 1204 during which data packet 202 is transmitted. Following the completion of data packet 202 transmission, at an end time, $T_E$, transmitting node 106 starts the ACK period timer and awaits receipt of an ACK signal 1206 from receiving node 108 during an ACK period 1208.

Following receipt of ACK signal 1206 during ACK period 1208 or following the expiration of ACK period 1208 without detecting ACK signal 1206, transmitting node 106 enters a forced idle state 1210. Following expiration of forced idle period (Current-FI-period) computed at task 1124, at $T_{FI}$, transmitting node 106 returns to natural idle state 1202.

As further shown in state diagram 1200, when receiving node 108 is in an idle state 1212 (which may be either natural idle or forced idle), receiving node 108 may receive data packet 202. For example, at a detection time, $T_D$, receiving node 108 begins receiving data packet 202. During a data receipt period 1214, receiving node 108 receives data packet 202, until receipt of data packet 202 is completed at a completion time, $T_C$. Following receipt of data packet 202, receiving node 108 transmits ACK signal 1206 toward transmitting node 106, as discussed below in connection with FIG. 20. Following transmission of ACK signal 1206, receiving node returns to idle state 1212.

State diagram 1200 illustrates the desired transmission and subsequent reception activities for data packet 202. Since receiving node 108 transmits ACK signal 1206 following successful reception of data packet 202, transmitting node 106 is aware of the outcome of the transmission attempt of data packet 202.

FIG. 13

Figure 13:
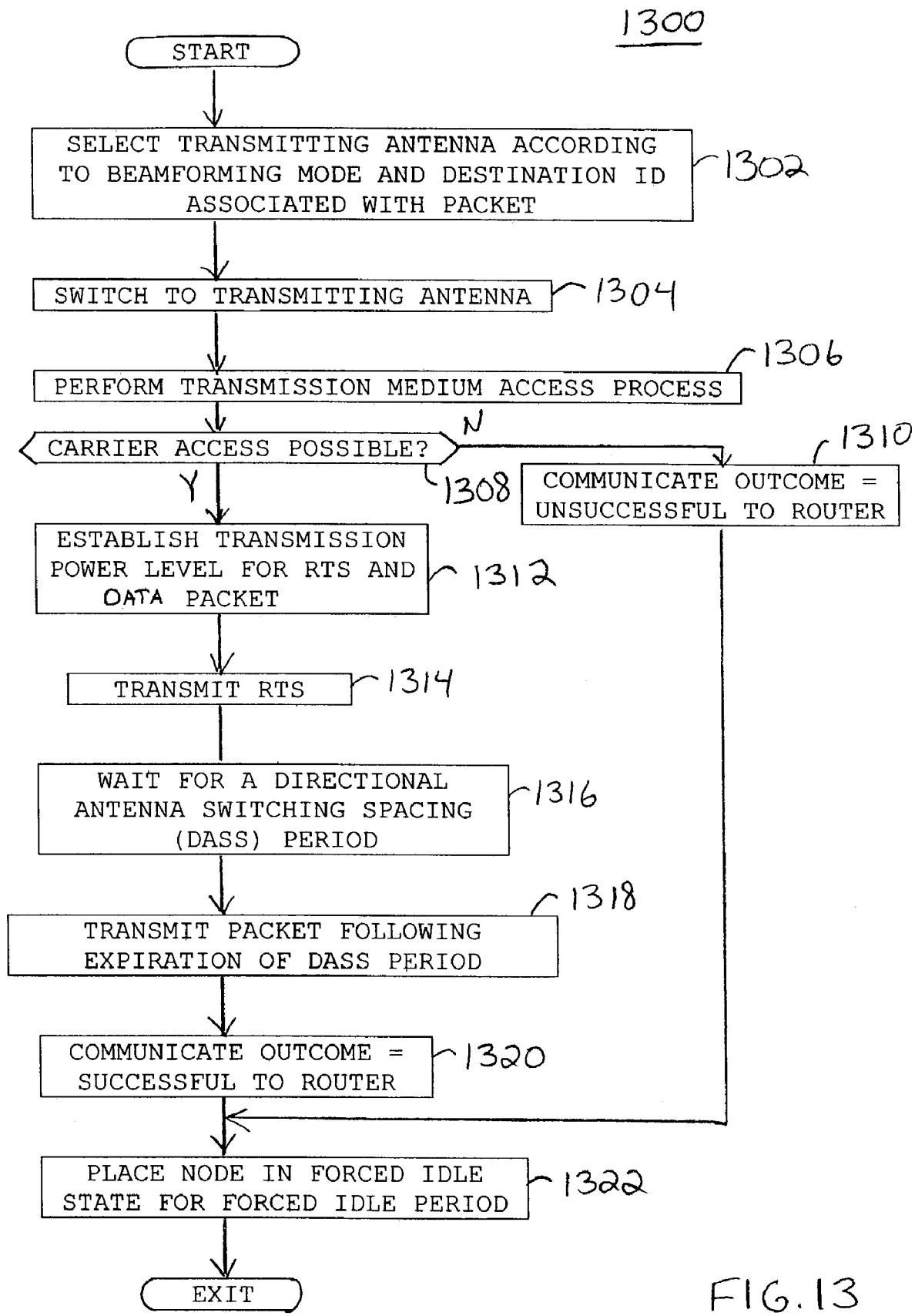
FIG. 13 shows a flowchart of a mode "C" transmit subprocess of the transmit process of FIG. 7.

FIG. 13 shows a flowchart of a mode "C" transmit subprocess 1300 of transmit process 700. In general, mode C transmit subprocess 1300 sets forth the operations executed by processor 500 of D-MAC system 226 when the one of transmission modes 304 associated with data packet 202 is mode C 404 (RTS only). Several of the tasks executed within mode C transmit subprocess 700 are similar to those described in connection with mode A transmit subprocess 800 and/or mode B transmit subprocess 1100. For brevity, tasks within subprocess 1300 that are similar to those described previously will receive cursory discussion below. However, those tasks that distinguish mode C transmit subprocess 1300 from the other transmit subprocesses, for example, mode A transmit subprocess 800 and mode B transmit subprocess 1100, will be described in detail.

Mode C transmit subprocess 1300 begins with a task 1302 to select a transmitting antenna. A task 1304 is performed to effect switching from omnidirectional antenna 232 to transmitting antenna 236. A task 1306 then initiates performance of transmission medium access process 1000. A query task 1308 assesses the results of the execution of transmission medium access process 1000 to determine whether carrier access is possible. When access to channel 104 in the beam direction of transmitting antenna 236 is not possible, process 1300 proceeds to a task 1310 to communicate an unsuccessful outcome indication of the transmission attempt to router 200 via link-layer module 224. When query task 1308 determines that access to channel 104 in the beam direction of transmitting antenna 236 is possible, subprocess 1300 proceeds to a task 1312. Tasks 1302, 1304, 1306, 1308, and 1310 are equivalent to tasks 802, 804, 806, 808, and 810 of mode A transmit subprocess 800, as well as to tasks 1102, 1104, 1106, 1108, and 1110 of mode B transmit subprocess 1100.

Task 1312 establishes the transmission power level for the transmission request, i.e., RTS, and data packet 202. The transmission power level is determined from the suggested transmission power level within radio profile 222.

Following task 1312, a task 1314 enables the transmission of the RTS from transmitting antenna 236 over wireless link toward receiving node 108. Task 1314 is distinguished from both task 814 of mode A transmit subprocess 800 and task 1114 of mode B transmit subprocess 1100 in that an RTS is transmitted prior to transmission of data packet 202. This RTS informs receiving node 108 that data packet 202 is to be transmitted from transmitting node 106 for receipt at receiving node 108. Receipt of the RTS at receiving node 108 enables receiving node 108 to select and switch to the one of its directional antennas that is best able to receive data packet 202, in anticipation of the receipt of data packet 202. Receiving activities associated with mode C 404 that are performed at receiving node 108 are discussed in connection with FIG. 21.

A task 1316 is performed in connection with task 1314. Task 1316 causes transmitting node 106 to be placed in a waiting state. Transmitting node 106 waits for a directional antenna switching spacing (DASS) period, and remains switched to transmitting antenna 236. The DASS allows time during which receiving node 108 can select and switch to a particular one of its directional antennas 234, 236, 238, and 240 to best receive data packet 202.

Following expiration of the DASS period, a task 1318 causes data packet 202 to be transmitted from transmitting antenna 236 at transmitting node 106. Following task 1318, a task 1320 causes D-MAC system 226 to communicate a successful outcome indication of the transmission of data packet 202 to router 200 via link-layer module 224. Following either of communication task 1310 (indicating an unsuccessful transmission of data packet 202) and communication task 1320 (indicating a successful transmission of data packet 202), mode C transmit subprocess 1300 proceeds to a task 1322.

Task 1322 places transmitting node 106 in a forced idle state for a forced idle period. In the case when data packet 202 has been successfully transmitted, i.e., following task 1320, the objective is to provide spacing, i.e., a contention window, between consecutive transmissions in order to allow other nodes 102 to send to transmitting node 106. Accordingly, the forced idle period may be set as described in connection with task 818. That is, the forced idle period may be computed in accordance with the procedure labeled Resetting Forced Idle Period When ACK Not Expected Or Upon ACK Reception.

In the case when data 202 has not been successfully transmitted, i.e., following task 1310, carrier access was found to be impossible. In such a case, the objective is to spread the communication traffic out. The forced idle period (Current-FI-period) may be computed in accordance with the procedure labeled Resetting Forced Idle When ACK Not Expected Or Upon ACK Reception. Following expiration of the forced idle period (Current-FI-period) computed at task 1322, process 1300 exits.

FIG. 14

FIG. 14 shows a state diagram 1400 of data packet transmission and reception activities between transmitting (TX) node 106 and receiving (RX) node 108 relative to time in response to the execution of mode C transmit subprocess 1300. As shown, transmitting node 106 is initially in a natural idle state 1402. At a start RTS time, $T_{RTSS}$, transmitting node 106 transmits an RTS 1404 from transmitting antenna 236. At an end RTS time, $T_{RTSE}$, transmitting node 106 then begins a DASS period 1406, during which receiving node 108 is allowed time receive RTS 1404 and switch to a selected one of its directional antennas 234, 236, 238, and 240.

Following expiration of DASS period 1406, transmitting node 106 begins a data transmission period 1408, at $T_s$, during which data packet 202 is transmitted. Following the completion of data packet 202 transmission, at an end time, $T_E$, transmitting node 106 enters a forced idle state 1410. Following expiration of forced idle period (Current-FI-period) computed at task 1322, at $T_{FI}$, transmitting node 106 returns to natural idle state 1402.

As further shown in state diagram 1400, when receiving node 108 is in an idle state 1412 (which may be either natural idle or forced idle), receiving node 108 may receive data packet RTS 1404. Once receiving node 108 receives RTS 1404 and switches to the best one of its directional antennas 234, 236, 238, and 240, receiving node 108 awaits data packet 202. At a detection time, $T_D$, receiving node 108 begins receiving data packet 202. During a data receipt period 1414, receiving node 108 receives data packet 202, until receipt of data packet 202 is completed at a completion time, $T_C$. Following receipt of data packet 202, receiving node returns to idle state 1412.

State diagram 1400 illustrates the desired transmission and subsequent reception activities for data packet 202. Since transmitting node 106 sends RTS 1404 in advance of data packet 202, receiving node 108 is aware of the impending transmission of data packet 202 from transmitting node 106. However, since no ACK signal is required, transmitting node 106 is unaware of the actual outcome of the transmission attempt of data packet 202 to receiving node 108.

FIG. 15

Figure 15:
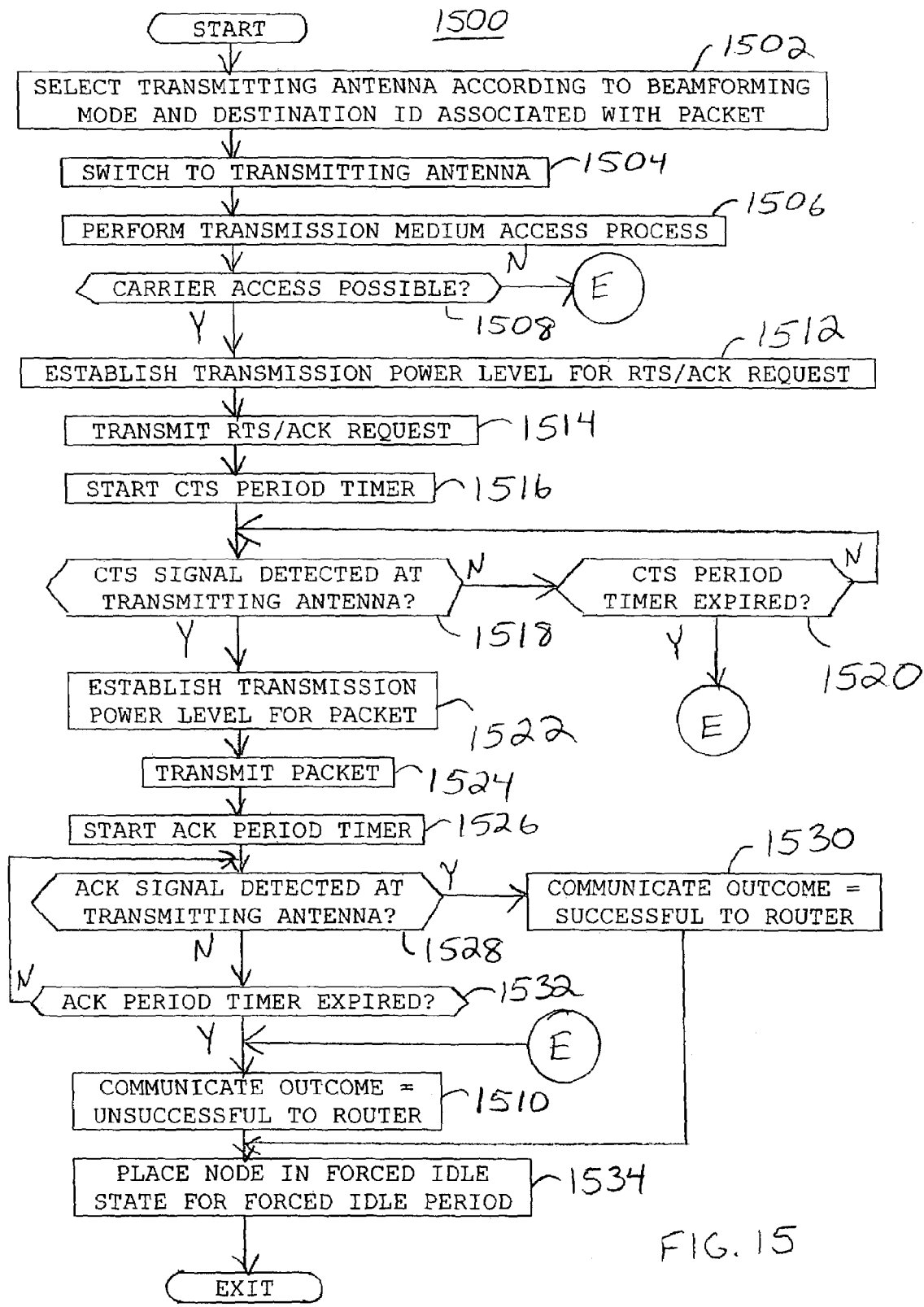
FIG. 15 shows a flowchart of a mode "D" transmit subprocess of the transmit process of FIG. 7.

FIG. 15 shows a flowchart of a mode "D" transmit subprocess 1500 of transmit process 700. In general, mode D transmit subprocess 1500 sets forth the operations executed by processor 500 of D-MAC system 226 when the one of transmission modes 304 associated with data packet 202 is mode D 406 (RTS, ACK). Several of the tasks executed within mode D transmit subprocess 1500 are equivalent to those described in the aforementioned transmit subprocesses 800, 1100, and 1300. Again for brevity, tasks within subprocess 1500 that are similar to those described previously will receive cursory discussion below. However, those tasks that distinguish mode D transmit subprocess 1500 from subprocesses 800, 1100, and 1300 will be described in detail.

Mode D transmit subprocess 1500 initially executes tasks 1502, 1504, 1506, 1508, and 1510. Tasks 1502, 1504, 1506, 1508, and 1510 are equivalent to tasks 802, 804, 806, 808, and 810, as described in detail above. When task 1508 determines that carrier access is possible, subprocess 1500 proceeds to a task 1512.

Task 1512 establishes the transmission power level for the RTS signal, that indicates ACK is requested, to be transmitted in advance of data packet 202. The transmission power level is the suggested transmission power level within radio profile 222.

Following task 1512, a task 1514 enables the transmission of the RTS signal and ACK request from transmitting antenna 236 over channel 104 toward receiving node 108. Task 1514 is distinguished from mode A, mode B, and mode C transmit subprocesses 800, 1100, and 1300 in that the transmission of the RTS signal and ACK request informs receiving node 108 that a clear to send (CTS) signal is to be sent when receiving node is free to receive data packet 202.

In addition, an ACK signal is to be sent when receiving node 108 successfully receives data packet 202. Receiving activities associated with mode D 406 that are performed at receiving node 108 are discussed in connection with FIG. 22.

A task 1516 is performed at transmitting node 106 in response to task 1514. Task 1516 starts a CTS period timer. The CTS period timer desirably includes the expected roundtrip propagation delay, the transmit/receive turnaround, and the processing time at each of transmitting and receiving nodes 106 and 108, respectively.

Once task 1516 starts the CTS period timer, transmitting node 106 awaits a CTS signal from receiving node 108. Thus, a query task 1518, determines at a given instant whether a CTS signal is detected at transmitting antenna 236 of transmitting node 106.

When the CTS signal is not detected at transmitting node 106, subprocess 1500 proceeds to a query task 1520. Query task 1520 determines whether the CTS period timer is expired, when the CTS period timer is not expired program control loops back to query task 1518, so that at a later instant, D-MAC system 226 can determine whether the CTS signal is detected. However, when the CTS period timer expires without detection of the CTS signal, process flow proceeds to task 1510 where D-MAC system 226 communicates an unsuccessful outcome indication of the transmission attempt to router 200 via link-layer module 224.

When query task 1518 detects the CTS signal, indicating that receiving node 108 is ready to receive data packet 202, program control proceeds to a task 1522.

Task 1522 establishes a transmission power level for data packet 202. The RTS transmitted to receiving node 108 includes the transmission power level ($P_{RTS}$) and its current receive threshold ($T_s$), i.e., the receive threshold of the sender. In response, the CTS signal is sent from receiving node 108 at a power level ($P_{CTS}$) as follows:

$$P_{CTS} = P_{RTS} - (R - T_s) + \text{MARGIN-POWER}$$

where, R is the received signal strength indicator (RSSI) of the RTS signal at receiving node 108, and MARGIN-POWER is a margin to account for fades, and so forth. In furtherance of the above description, transmission power level ($P_D$) for data packet is computed similarly, as follows:

$$P_D = P_{CTS} - (R_{CTS} - T_R) + \text{MARGIN-POWER}$$

where, $R_{CTS}$ is the received signal strength indicator (RSSI) of the CTS signal at transmitting node 106 and $T_R$ is the receive threshold of the receiver. The above establishment of transmission power level for data packet 202 is applicable to the first time transmission of data packet 202 is attempted. Link-layer module 224 manages the number of repeated attempts to transmit data packet 202 when transmission of data packet 202 is unsuccessful. Subsequent transmissions of the RTS signal, in advance of subsequent attempts to transmit data packet 202, are transmitted at progressively higher power levels up to a maximum power possible.

Following task 1522, a task 1524 enables the transmission of data packet 202 from transmitting antenna over wireless link toward receiving node 108. Receiving activities associated with mode D 406 that are performed at receiving node 108 are discussed in connection with FIG. 22.

A task 1526 is performed in connection with task 1524. Task 1526 starts an ACK period timer at transmitting node 106. The ACK period timer desirably includes the expected roundtrip propagation delay, the transmit/receive turnaround, and the processing time at each of transmitting and receiving nodes 106 and 108, respectively.

Once task 1526 starts the ACK period timer, transmitting node 106 awaits an ACK signal from receiving node 108. Thus, a query task 1528, determines at a given instant whether an ACK signal is detected at transmitting antenna 236 of transmitting node 106. When the ACK signal is detected, indicating that receiving node 108 successfully received data packet 202, program control proceeds to a task 1530 where a D-MAC system 226 communicates to router 200 via link-layer module 224 a successful outcome indication of the transmission of data packet 202.

When query task 1528 determines that the ACK signal is not detected at transmitting node 106, subprocess 1500 proceeds to a query task 1532. Query task 1532 determines whether the ACK period timer is expired, when the ACK period timer is not expired program control loops back to query task 1528, so that at a later instant, D-MAC system 226 can determine whether the ACK signal is detected. However, when the ACK period timer expires without detection of the ACK signal, process flow proceeds to task 1510 where D-MAC system 226 communicates an unsuccessful outcome of the transmission attempt to router 200 via link-layer module 224.

Following either of communication task 1510 (indicating an unsuccessful transmission of data packet 202) and communication task 1530 (indicating a successful transmission of data packet 202), mode D transmit subprocess 1500 proceeds to a task 1534.

Task 1534 places transmitting node 106 in a forced idle state for a forced idle period.

In the case when no CTS signal is received during the CTS period, i.e., following a positive response to query task 1520 and procession to task 1510, the forced idle period (Current-FT-period) may be computed in accordance with the following procedure.

Resetting Forced Idle Period Upon No CTS
CWmin=INTER-RTS-FI-LOW*retry-count

CWmax=INTER-RTS-FI-HIGH*retry-count where in an exemplary configuration,
INTER-RTS-FI-LOW=1000 μsec
INTER-RTS-FI-HIGH=1200 μsec
Current-FI-period=uniform-random(CWmin, CWmax)

The retry-count is the number of attempts that has thus far been made to transmit the RTS signal, without receiving a CTS signal in return. Thus, in an exemplary embodiment, Current-FI-period represents a linear increase in the contention window. CWmin and CWmax are "local variables", used herein to enhance readability. The strategy described above implicitly assumes that the likely reason that the CTS signal was not received was that receiving node 108 was transmitting or receiving a different data packet.

At task 1534, in the case when data packet 202 has been successfully transmitted, i.e., following task 1530, the objective is to provide spacing, i.e., a contention window, between consecutive transmissions in order to allow other nodes 102 to send to transmitting node 106. Accordingly, the forced idle period may be set as described in connection with task 818. That is, the forced idle period may be computed in accordance with the procedure labeled Resetting Forced Idle Period When ACK Not Expected Or Upon ACK Reception, described above.

At task 1534, in the case when data 202 has not been successfully transmitted, i.e., following a positive response to query task 1532 and task 1510, data packet 202 or the ACK signal may have collided with other traffic on channel 104. Thus, the objective is to spread the communication traffic out. Accordingly, the forced idle period may be set as described in connection with task 1124. In other words, the forced idle period (Current-FI-period) may be computed in accordance with procedure labeled Resetting Forced Idle Period Upon No ACK Reception. Following expiration of the forced idle period (Current-FI-period) computed at task 1534, process 1500 exits.

Four techniques were described above for resetting the forced idle period. These techniques include 1) Resetting Forced Idle Period When ACK Not Expected Or Upon ACK Reception, described in connection with FIG. 8; 2) Resetting Forced Idle Period Upon Channel Busy, described in connection with FIG. 10; 3) Resetting Forced Idle Period Upon No ACK Reception, described in connection with FIG. 11; and 4) Resetting Forced Idle Period Upon No CTS, described in connection with FIG. 15. The present invention advantageously separates out the resetting of forced idle period in a modular manner from the processes described herein so that the exact computations for the forced idle period can be readily modified as needed. For example, the Resetting Forced Idle Period Upon No CTS could be modified to do an exponential increase and linear decrease, as opposed to the linear increase and step decrease described herein.

FIG. 16

FIG. 16 shows a state diagram 1600 of data packet transmission and reception activities between transmitting (TX) node 106 and receiving (RX) node 108 relative to time, in response to the execution of mode D transmit subprocess 1500. As shown, transmitting node 106 is initially in a natural idle state 1602. At a start RTS time, $T_{RTS}$, transmitting node 106 transmits an RTS 1604 from transmitting antenna 236. At an end RTS time, $T_{RTSE}$, transmitting node 106 starts the CTS period timer and awaits receipt of a CTS signal 1606 from receiving node 108 during a CTS period 1608.

Following receipt of CTS signal 1608 at transmitting node 106, transmitting node 106 begins a data transmission period 1610, at $T_S$, during which data packet 202 is transmitted. Following the completion of data packet 202 transmission, at an end time, $T_E$, transmitting node 106 starts the ACK period timer and awaits receipt of an ACK signal 1612 from receiving node 108 during an ACK period 1614.

Following receipt of ACK signal 1612 during ACK period 1614 or following the expiration of ACK period 1614 without detecting ACK signal 1612, transmitting node 106 enters a forced idle state 1616. Following expiration of forced idle period (Current-FI-period) computed at task 1534, at $T_{FI}$, transmitting node 106 returns to natural idle state 1602.

As further shown in state diagram 1600, when receiving node 108 is in an idle state 1618 (which may be either natural idle or forced idle), receiving node 108 receives RTS 1604, transmits CTS signal 1606, and awaits reception of data packet 202.

By way of example, at a detection time, $T_D$, receiving node 108 begins receiving data packet 202. During a data receipt period 1620, receiving node 108 receives data packet 202, until receipt of data packet 202 is completed at a completion time, $T_C$. Following receipt of data packet 202, receiving-node 108 transmits ACK signal 1612 toward transmitting node 106, as discussed below in connection with FIG. 22. Following transmission of ACK signal 1612, receiving node 108 returns to idle state 1618.

State diagram 1600 illustrates the desired transmission and subsequent reception activities for data packet 202. Since transmitting node 106 sends RTS 1604 in advance of data packet 202, receiving node 108 is aware of the impending transmission of data packet 202 from transmitting node 106. In addition, the transmission of CTS 1606 from receiving node 108 informs transmitting node 106 that receiving node 108 is available to receive data packet 202. Furthermore, since receiving node 108 transmits ACK signal 1612 following successful reception of data packet 202, transmitting node 106 is aware of the outcome of the transmission attempt of data packet 202.

The above described mode A, mode B, mode C, and mode D transmit subprocesses 800, 1100, 1300, and 1500 set forth the tasks performed by transmitting node 106 to transmit data packet 202, in accordance with a particular one of transmission modes 304. The forced idle state discussed above serves to guarantee a minimum amount of time that transmitting node 106 is not busy sending, in order to enable other nodes to send to it. In addition, by placing node 106 in the forced idle state when an expected response is not obtained, the offered load to the network can be controlled.

The amount of time spent in the forced idle state depends upon the reason that the node went into the forced idle state. As discussed above, there are four reasons that push transmitting node 106 into the forced idle state. These reasons include 1) data packet transmission succeeds (ACK received or not expected, 2) data packet transmission fails (no ACK received when expected, 3) RTS fails (no CTS received when expected, and 4) channel 104 is busy.

FIG. 17

Figure 17:
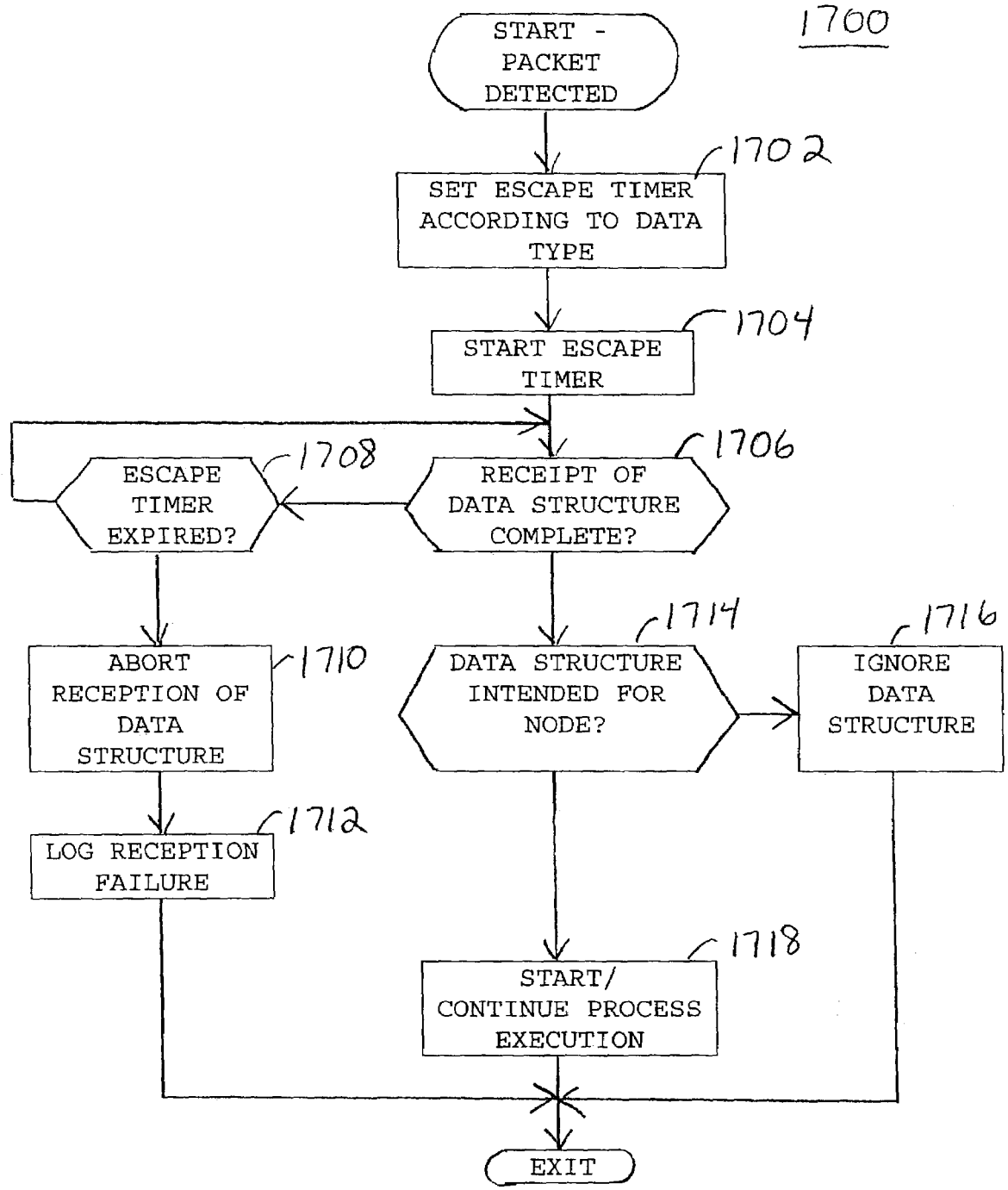
FIG. 17 shows a flowchart of an escape timing subprocess of the access control process of FIG. 6.

FIG. 17 shows a flowchart of an escape timing subprocess 1700 of the access control process 508. Previous discussion concentrated on the transmission of data packet 202 from transmitting node 106, and the possible reception of a CTS signal and/or an ACK signal at transmitting node 106. Future discussion of FIGS. 18-22 concentrates on the reception of an RTS signal and/or data packet 202 at one of nodes 102, for example, at receiving node 108. Escape timing subprocess 1700 may be invoked whenever a data structure pertinent to the present invention, i.e., RTS signal, CTS signal, data packet 202, or ACK signal is received at any of nodes 102 at any of omnidirectional antenna 232 and directional antennas 234, 236, 238, and 240. Escape timing process 1700 is intended to avoid wasting time receiving signals not intended for the receiving one of nodes 102, or to discontinue receiving signals upon detection of collisions. Accordingly, escape timing subprocess 1700 is a background routine that is performed any time a data structure is received, and affects the continued execution of transmit process 700 or a reception process described below.

Escape timing subprocess 1700 is described as being executed at receiving node 108 for simplicity of illustration. However, it should be understood that D-MAC system 226 at each of nodes 102 executes subprocess 1700 whenever receipt of a data structure, i.e., RTS signal, CTS signal, data packet 202, or ACK signal, is detected.

Escape timing subprocess 1700 is initiated upon detection of a packet. The "START" block of escape timing subprocess 1700 indicates this by the use of the term "START-PACKET DETECTED." In response to detection of a packet, subprocess 1700 proceeds to a task 1702.

Task 1702 sets an escape period according to a data type of the data structure. The escape period is based on the duration of the expected data structure. By way of example, if receiving node 108 is waiting for data packet 202, then node 108 sets the escape timer to be slightly longer than the duration needed to receive data packet 202. The duration needed may be specified in the preceding RTS, in the case of mode C 404 and mode D 406 transmission modes 304. By default, D-MAC system 226 may also set the escape timer to a configured value representing the threshold maximum size of data packets 202 that can be sent without a preceding RTS, or to a configured value representative of the packet size of an RTS.

A task 1704 is performed in response to task 1702. Task 1704 starts the escape timer. A query task 1706 determines whether reception of the data structure is complete. In other words, D-MAC system 226 monitors for some end of packet identification, such as, end of packet identifier 218, associated with the received data structure.

When query task 1706 determines that receipt of the data structure is incomplete, a query task 1708 determines whether the escape timer is expired. When the escape timer is not expired, program control loops back to query task 1706 to continue to monitor for the end of packet identification. However, when query task 1708 determines that the escape timer is expired, program control flows to a task 1710. Task 1710 causes D-MAC system 226 to abort the reception of the data structure, thus avoiding collision. A task 1712 is initiated to log the reception failure of the data structure at receiving node 108. Subprocess 1700 then exits without receipt of a data structure, at which time receiving node 108 is freed to transmit in a direction different from the direction at which the data structure was being received.

When query task 1706 determines that receipt of the data structure is complete, a query task 1714 determines whether the data structure being received is intended for receiving node 108. This is determined by reviewing destination identifier 214 associated with the received data structure. When the data structure is not intended for receiving node 108, the data structure may be ignored at a task 1716. Accordingly, at task 1716, D-MAC system 226 discontinues capture of the data structure intended for another of nodes 102. Following task 1716, subprocess 1700 exits, and receiving node 108 freed to transmit in a direction different from the direction at which the data structure was being received.

In an alternative scenario, when the data structure is not intended for receiving node 108, D-MAC system 226 may enable the communication of the data structure to router 200 when receiving node 108 is set in a promiscuous mode for link characterization purposes.

When query task 1714 determines that the data structure being received is intended for receiving node 108, program control proceeds to a task 1718. Task 1718 permits D-MAC system 226 to initiate execution of or to continue executing transmit process 700 or the receive process (discussed below) depending upon what the data structure is, i.e., RTS signal, CTS signal, data packet 202, or ACK signal. Following task 1718, escape timing subprocess 1700 exits.

FIG. 18

Figure 18:
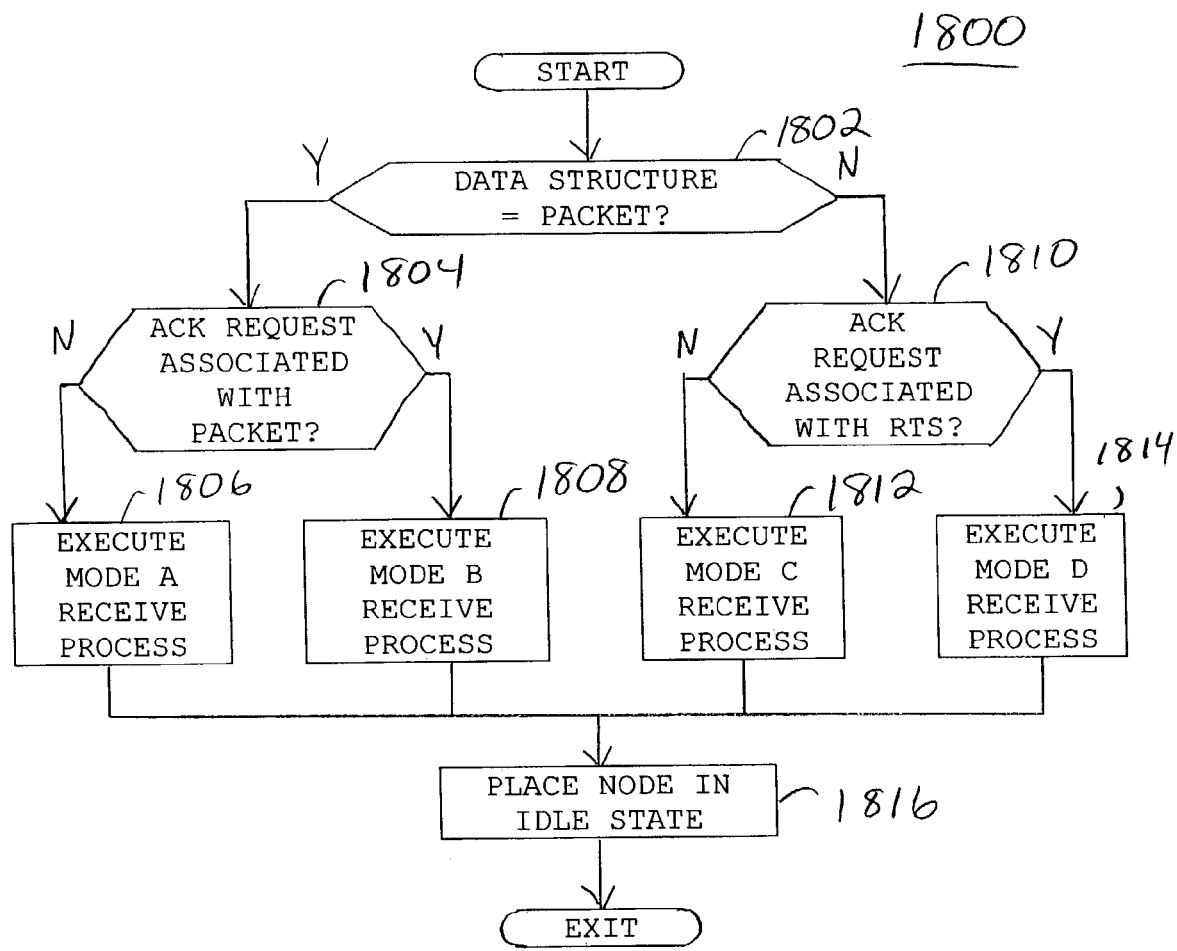
FIG. 18 shows a flowchart of a receive process of access control process of FIG. 6.

FIG. 18 shows a flowchart of a receive process 1800 of access control process 508. When an RTS or ACK request is detected at query task 608 of access control process 508, task 610 of access control process 508 causes the execution of receive process 1800. In general, receive process 1800 manages the reception of data packet 202 in accordance primitives 507 associated with data packet 202 and supplied by transmitting node 106. The reception activities performed in response to each of the four transmission modes 304 are described separately herein for clarity of illustration. In addition, for purposes of illustration, receive process 1800 is described as being executed at receiving node 108, in response to signals received from transmitting node 106. However, it should be readily apparent that the reverse may occur. That is, node 108 may be transmitting a second one of data packets toward node 106.

Receive process 1800 begins at a query task 1802. At query task 1802, processor 500 of D-MAC system 226 evaluates the received data structure and determines whether the data structure is data packet 202. When receiving node 108 receives data packet 202, program control proceeds to a query task 1804.

Query task 1804 evaluates data packet 202 to determine whether an ACK request is associated with data packet 202. When query task 1804 determines that an ACK request is not associated with data packet 202, receive process 1800 proceeds to a task 1806. Conversely, when query task 1804 determines that an ACK request is associated with data packet 202, receive process 1800 proceeds to a task 1808.

A negative response at query task 1802, indicates (for the purposes of the present invention) that the received data structure is a request to send (RTS) signal. As such, program control proceeds to a query task 1810. Query task 1810 evaluates the data structure containing the RTS signal to determine whether an ACK request is associated with data packet 202 and the RTS signal. When query task 1810 determines that an ACK request is not associated with the RTS signal, receive process 1800 proceeds to a task 1812. Conversely, when query task 1810 determines that an ACK request is associated with the RTS signal, receive process 1800 proceeds to a task 1814.

Through the execution of query tasks 1802, 1804, and 1810, D-MAC system 226 at receiving node 108 readily ascertains the one of transmission modes 304 associated with transmission of data packet 202, so as to supply the appropriate signaling in response to receipt of data packet 202.

Consequently, a positive response to query task 1802 and a negative response to query task 1804 results in the determination of mode A 400 being associated with data packet 202. Thus, task 1806 causes the execution of a mode A receive subprocess, described in connection with FIG. 19. Similarly, a positive response to each of query tasks 1802 and 1804 results in the determination of mode B 402 being associated with data packet 202. Thus, task 1808 causes the execution of a mode B receive subprocess, described in connection with FIG. 20.

A negative response to each of query tasks 1802 and 1810 results in the determination of mode C 404 being associated with data packet 202. Thus, task 1812 causes the execution of a mode C receive subprocess, described in connection with FIG. 21. A negative response to query task 1802 and a positive response to query task 1810 results in the determination of mode D 406 being associated with data packet 202. Thus, task 1814 causes the execution of a mode D transmit subprocess, described in connection with FIG. 22. Those skilled in the art will appreciate that query tasks 1802, 1804, and 1810 may be combined into a single query activity that identifies which of transmission modes 304 is associated with data packet 202 so that the appropriate receive subprocess, based upon transmission modes 304, may be executed.

Following any of tasks 1806, 1808, 1812, and 1814, receive process 1800 proceeds to a task 1816. Task 1816 causes transmitting node 106 to return to the natural idle state until another communication event, in the form of initiating data packet transmission or receiving data structures from others of nodes 102, is detected. Following task 1816, process 1800 exits.

FIG. 19

Figure 19:
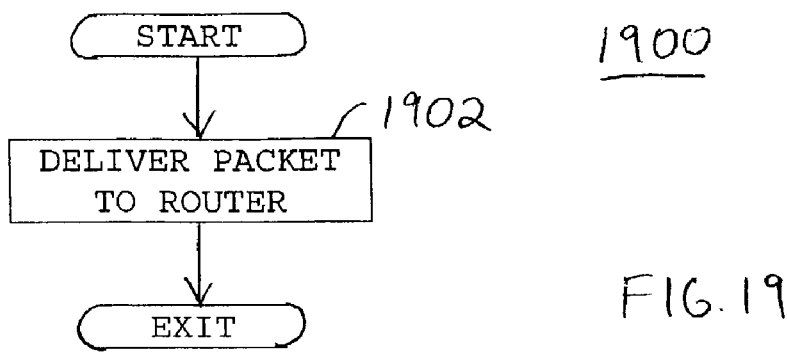
FIG. 19 shows a flowchart of a mode A receive subprocess of the receive process of FIG. 18.

FIG. 19 shows a flowchart of a mode A receive subprocess 1900 of receive process 1800. In general, mode A receive subprocess 1900 sets forth the operations executed by processor 500 of D-MAC system 226 at receiving node 108 when the one of transmission modes 304 associated with data packet 202 is mode A 400 (no RTS, no ACK). Thus, mode A receive subprocess 1900 is the companion to mode A transmit subprocess 800.

Mode A receive subprocess 1900 entails a single task 1902. Upon receipt of data packet 202, task 1902 delivers, i.e., communicates, data packet 202 to router 200. Following task 1902, subprocess 1900 exits, and program control returns to receive process 1800 where receiving node 108 is placed in the natural idle state at task 1816, with continued monitoring of channels 104 at omnidirectional antenna 232.

Since transmitting and receiving nodes 106 and 108, respectively, are not exchanging primitives (RTS, CTS, and ACK), receiving node 108 is unaware of the impending transmission of data packet 202 from transmitting node 106, until data packet 202 arrives. In addition, transmitting node 106 is unaware of an unsuccessful receipt of data packet 202 at receiving node 108.

FIG. 20

Figure 20:
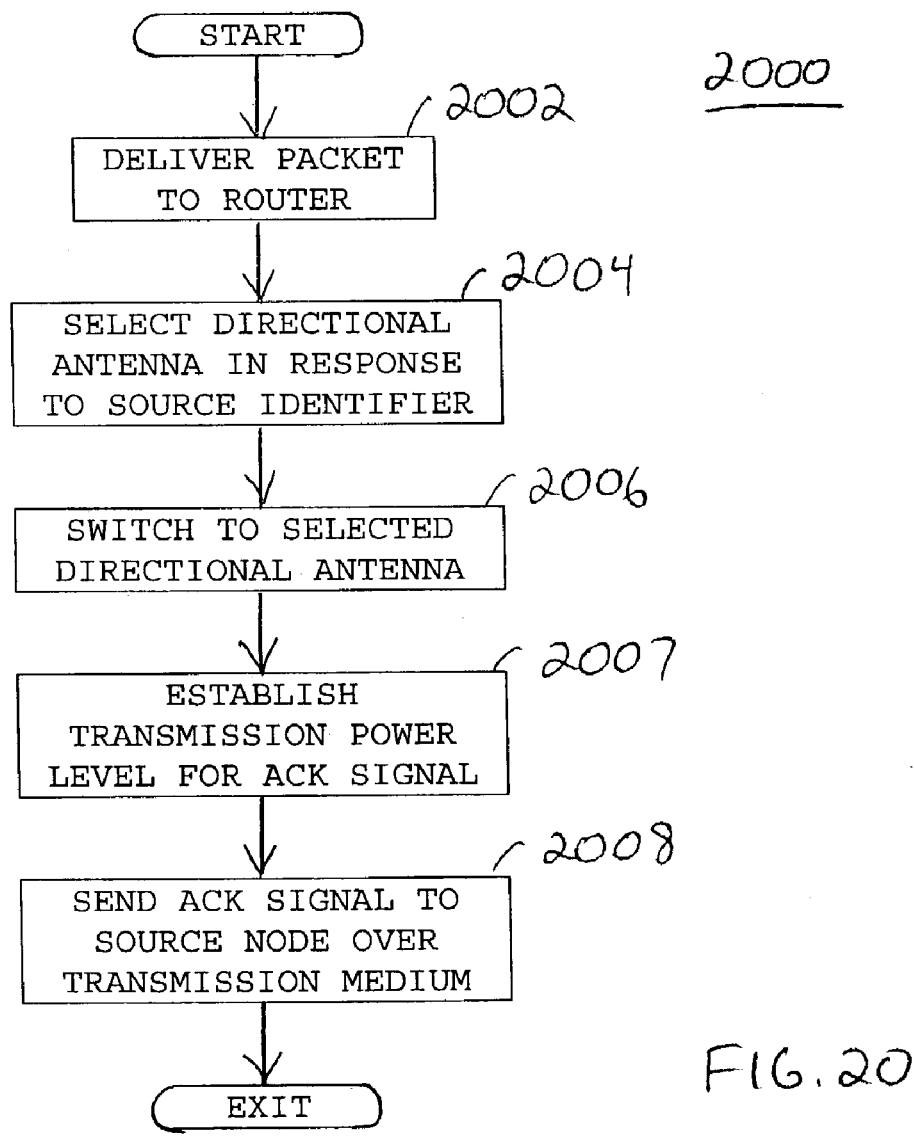
FIG. 20 shows a flowchart of a mode B receive subprocess of the receive process of FIG. 18.

FIG. 20 shows a flowchart of a mode B receive subprocess 2000 of receive process 1800. In general, mode B receive subprocess 2000 sets forth the operations executed by processor 500 of D-MAC system 226 at receiving node 108 when the one of transmission modes 304 associated with data packet 202 is mode B 402 (ACK only). Thus, mode B receive subprocess 2000 is the companion to mode B transmit subprocess 1100.

Mode B receive subprocess 2000 begins with a task 2002. Upon receipt of data packet 202, task 2002 delivers, i.e., communicates, data packet 202 to router 200. Following task 2002, a task 2004 is performed. At task 2004, one of first, second, third, and fourth directional antennas 234, 236, 238, and 240 is selected in response to source identifier 212 of data packet 202.

Task 2004 then causes processor 500 at receiving node 108 to access antenna characteristics database 512 to select one of first, second, third, and fourth directional antennas 234, 236, 238, and 240 for transmission of ACK signal 1206 toward transmitting node 106 over channel 104. It should be recalled that data packet 202 was received at omnidirectional antenna 232. As such, in this scenario, omnidirectional antenna 232 is a receiving antenna. Source identifier 212 of data packet 202 enables receiving node 108 to select one of directional antennas 234, 236, 238, and 240 best suited for responding to transmitting node 106 via transmission of ACK signal 1206 to indicate successful reception of data packet 202. In this exemplary scenario, task 2004 selects fourth directional antenna 240 to be a "responding" antenna. Accordingly, throughout the discussion of mode B receive subprocess 2000, fourth directional antenna 240 is referred to as responding antenna 240.

Following task 2004, a task 2006 enables the activation of switch 230 to switch from omnidirectional antenna 232 to responding antenna 240. A task 2007 is performed in response to task 2006. At task 2007, a transmission power level is established for transmission of ACK signal 1206. In an exemplary embodiment, the transmission power level for ACK signal is the power indicated in radio profile 222, or the maximum power if none is specified.

Next, a task 2008 enables the transmission of ACK signal 1206 from responding antenna 240 over channel 104 toward transmitting node 106. Following task 2008, mode B receive subprocess 2000 exits, and program control returns to receive process 1800 where receiving node 108 is placed in the natural idle state at task 1816, with continued monitoring of channels 104 at omnidirectional antenna 232.

Since receiving node 108 transmits ACK signal 1206 following successful reception of data packet 202, the receipt of ACK signal 1206 at transmitting node 106 informs transmitting node 106 of the successful outcome of the transmission attempt of data packet 202.

FIG. 21

Figure 21:
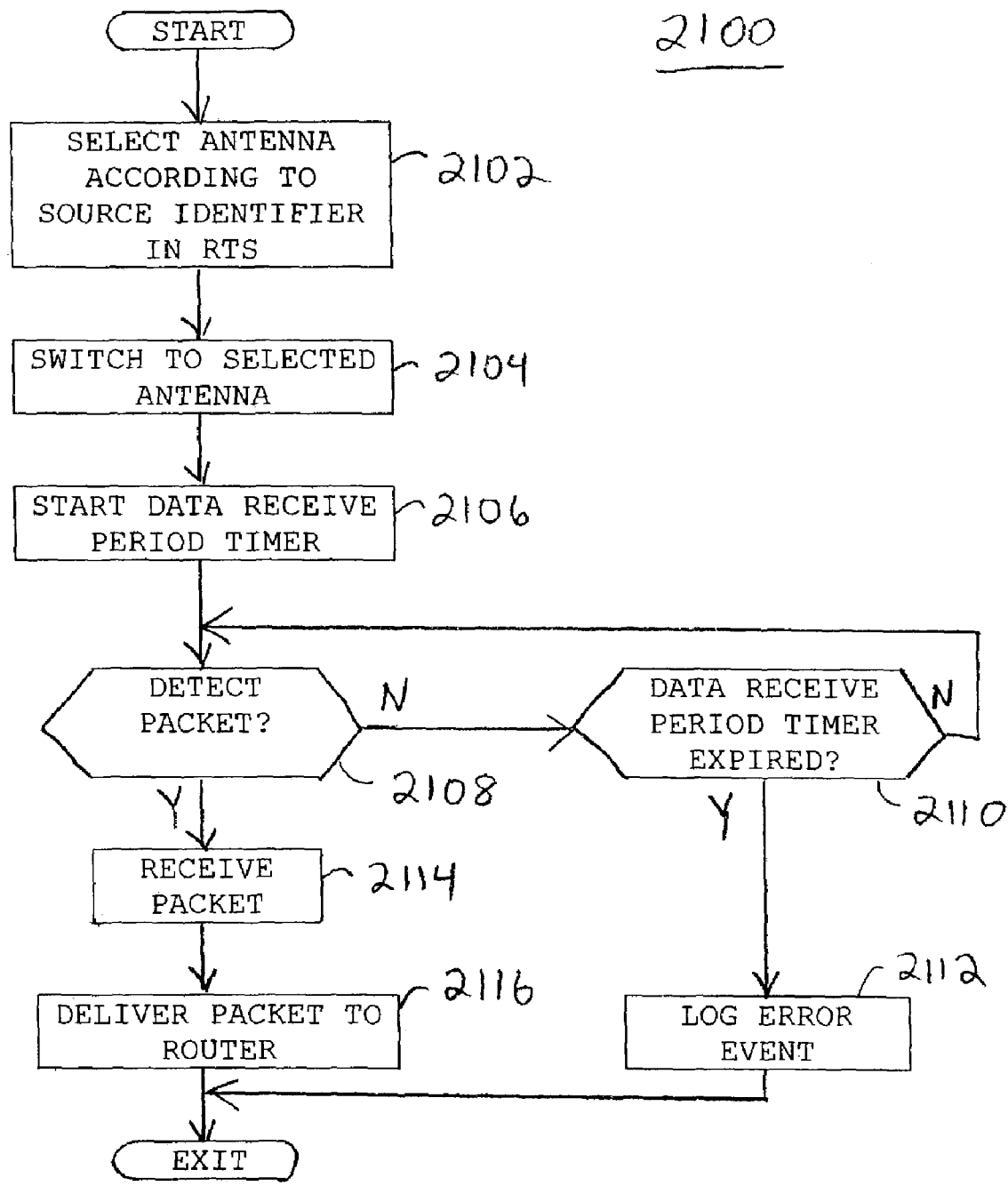
FIG. 21 shows a flowchart of a mode C receive subprocess of the receive process of FIG. 18.

FIG. 21 shows a flowchart of a mode C receive subprocess 2100 of receive process 1800. In general, mode C receive subprocess 2100 sets forth the operations executed by processor 500 of D-MAC system 226 at receiving node 108 when the one of transmission modes 304 associated with data packet 202 is mode C 404 (RTS only). Thus, mode C receive subprocess 2100 is the companion to mode C transmit subprocess 1300.

Mode C receive subprocess 2100 begins with a task 2102. Upon receipt of RTS 1404, task 2102 selects one of first, second, third, and fourth directional antennas 234, 236, 238, 240 in response to source identifier 212 in RTS 1404 that is associated with data packet 202. Task 2102 causes processor 500 at receiving node 108 to access antenna characteristics database 512 to select one of first, second, third, and fourth directional antennas 234, 236, 238, and 240 for reception of data packet 202. It should be recalled that RTS 1404 was received at omnidirectional antenna 232. Source identifier 212 of data packet 202 enables receiving node 108 to select one of directional antennas 234, 236, 238, and 240 best suited for receiving data packet 202 from transmitting node 106. In this exemplary scenario, task 2102 selects fourth directional antenna 240 to be a "receiving" antenna. Accordingly, throughout the discussion of mode C receive subprocess 2100, fourth directional antenna 240 is referred to as receiving antenna 240.

Following task 2102, a task 2104 enables the activation of switch 230 to switch from omnidirectional antenna 232 to receiving antenna 240. Next, a task 2106 starts a data receive period timer for data receive period. The data receive period desirably includes the expected roundtrip propagation delay, the transmit/receive turnaround, and the processing time at each of transmitting and receiving nodes 106 and 108, respectively.

Once the data receive period timer is running, D-MAC system 226 at receiving node 108 awaits reception of data packet 202. As such, a query task 2108 determines whether receipt of data packet 202 is detected. When data packet 202 is not detected, program control proceeds to a query task 2110.

Query task 2110 determines whether the data receive period timer has expired. If the data receive period timer has not expired, program control loops back to query task 2108 to continue monitoring for receipt of data packet 202. However, when query task 2110 determines that the data receive period timer has expired without detection of data packet 202 at receiving antenna 240, program control proceeds to a task 2112. Task 2112 logs an error event at receiving node 108, indicating that reception of data packet 202 was unsuccessful. Following task 2112, subprocess 2100 exits.

When receipt of data packet 202 is detected at query task 2108, subprocess 2100 proceeds to a task 2114 at which data packet is received at D-MAC system 226 of receiving node 108. Upon receipt of data packet 202 at task 2114, a task 2116 delivers, i.e., communicates, data packet 202 to router 200. Following task 2116, subprocess 2100 exits, and program control returns to receive process 1800 where receiving node 108 is placed in the natural idle state at task 1816, with continued monitoring of channels 104 at omnidirectional antenna 232. Since receiving node 108 receives RTS signal 1404 at omnidirectional antenna 232 prior to receipt of data packet 202, receiving node 108 is aware of the impending transmission of data packet 202 from transmitting node 106. However, receiving node 106 does not respond with an ACK signal following successful reception of data packet 202. As such, transmitting node 106 is unaware of an unsuccessful receipt of data packet 202 at receiving node 108.

FIG. 22

Figure 22:
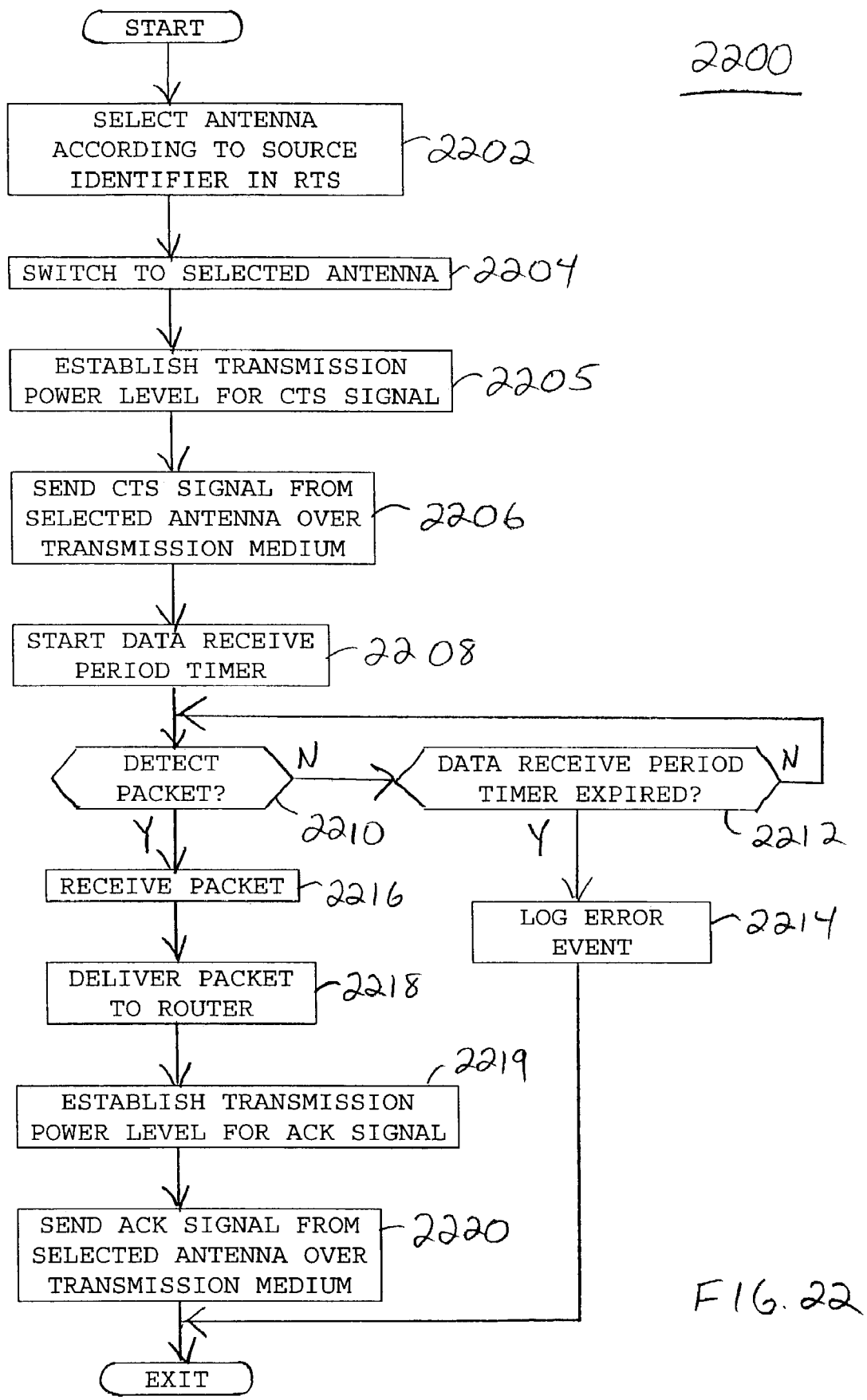
FIG. 22 shows a flowchart of a mode D receive subprocess of the receive process of FIG. 18.

FIG. 22 shows a flowchart of a mode D receive subprocess 2200 of receive process 1800. In general, mode D receive subprocess 2200 sets forth the operations executed by processor 500 of D-MAC system 226 at receiving node 108 when the one of transmission modes 304 associated with data packet 202 is mode D 406 (RTS, ACK). Thus, mode D receive subprocess 2200 is the companion to mode D transmit subprocess 1500.

Mode D receive subprocess 2200 begins with a task 2202. Upon receipt of RTS 1604, task 2202 selects one of first, second, third, and fourth directional antennas 234, 236, 238, 240 in response to source identifier 212 in RTS 1604 that is associated with data packet 202. Task 2202 causes processor 500 at receiving node 108 to access antenna characteristics database 512 to select one of first, second, third, and fourth directional antennas 234, 236, 238, and 240 for reception of data packet 202. It should be recalled that RTS 1604 was received at omnidirectional antenna 232 of receiving node 108. Source identifier 212 of data packet 202 enables receiving node 108 to select one of directional antennas 234, 236, 238, and 240 best suited for receiving data packet 202 from transmitting node 106. In this exemplary scenario, task 2202 selects fourth directional antenna 240 to be a "receiving" antenna. Accordingly, throughout the discussion of mode D receive subprocess 2200, fourth directional antenna 240 is referred to as receiving antenna 240.

Following task 2202, a task 2204 enables the activation of switch 230 to switch from omnidirectional antenna 232 to receiving antenna 240. A task 2205 is performed in response to task 2204. At task 2205, a transmission power level is established for transmission of CTS signal 1606. In an exemplary embodiment, CTS signal 1606 is sent with a transmission power level equal to $P_{CTS}$ described in connection with task 1522 of FIG. 15.

Next, a task 2206 causes D-MAC system 226 to send CTS signal 1606 from the selected antenna, i.e., receiving antenna 240 over channel 104.

Once CTS signal 1606 is transmitted from receiving node 108 toward transmitting node 106 via channel 104, a task 2208 starts a data receive period timer for a data receive period. The data receive period is set in accordance with the round trip propagation delay, the transmit/receive turnaround and the processing time at each of transmitting and receiving nodes 106 and 108, respectively.

Once the data receive period timer is running, D-MAC system 226 at receiving node 108 awaits reception of data packet 202. As such, a query task 2210 determines whether receipt of data packet 202 is detected. When data packet 202 is not detected, program control proceeds to a query task 2212.

Query task 2212 determines whether the data receive period timer has expired. If the data receive period timer has not expired, program control loops back to query task 2210 to continue monitoring for receipt of data packet 202. However, when query task 2212 determines that the data receive period timer has expired without detection of data packet 202 at receiving antenna 240, program control proceeds to a task 2214. Task 2214 logs an error event at receiving node 108, indicating that reception of data packet 202 was unsuccessful. Following task 2214, subprocess 2200 exits.

When query task 2210 detects receipt of data packet 202 at receiving antenna 240, subprocess 2200 proceeds to a task 2216, at which data packet 202 is received at D-MAC system 226 of receiving node 108. Upon receipt of data packet 202 at task 2216, a task 2218 delivers, i.e., communicates, data packet 202 to router 200. A task 2219 is performed in connection with task 2218. At task 2219, a transmission power level is established for ACK signal 1612. In an exemplary embodiment, ACK signal 1612 is power adjusted in a manner similar to that described in connection with task 1522 of FIG. 15.

Next, a task 2220, receiving node 108 enables the transmission of ACK signal 1612 from receiving antenna 240 over channel 104 toward transmitting node 106. Following task 2220, mode C receive subprocess 2200 exits, and program control returns to receive process 1800 where receiving node 108 is placed in the natural idle state at task 1816, with continued monitoring of channels 104 at omnidirectional antenna 232.

Since receiving node 108 receives RTS 1604 at omnidirectional antenna 232 prior to receipt of data packet 202, receiving node 108 is aware of the impending transmission of data packet 202 from transmitting node 106. In addition, the transmission of CTS 1606 from receiving node 108 informs transmitting node 106 that receiving node 108 is available to receive data packet 202. Furthermore, since receiving node 108 transmits ACK signal 1612 following successful reception of data packet 202, transmitting node 106 is further informed of the outcome of the transmission attempt of data packet 202.

In summary, the present invention teaches of a method and system, in a wireless network of nodes, for controlling access to a transmission medium. The directional media access control (D-MAC) protocols exploit the efficient use of directional antennas at each node within a wireless network of nodes. In particular, point-to-point data packets are transmitted and received directionally, using the antenna presumed to have the maximum gain toward the receiver/transmitter. In addition, nodes within a wireless network equipped with a single transceiver and one or more directional antennas provide efficient throughput of data packets, and offer better security due to the nature of directional transmissions.

Although the preferred embodiments of the invention have been illustrated and described in detail, it will be readily apparent to those skilled in the art that various modifications may be made therein without departing from the spirit of the invention or from the scope of the appended claims. For example, there is a great variation in the order in which many of the tasks described herein may be performed. In addition, the forced idle period for the forced idle state may be adjusted using different algorithms to yield different variants of the same general strategy.

What is claimed is:

1. In a wireless network of nodes, each of said nodes having a transceiver and a plurality of antennas in selective communication with said transceiver, a computer-based method for controlling access to a transmission medium, said method comprising:

obtaining a packet for transmission at said transceiver of a transmitting node of said nodes, said packet including a destination identifier of a receiving node of said nodes;

selecting a transmitting antenna from said plurality of antennas in response to said destination identifier;

switching to said transmitting antenna;

determining whether said transmission medium is free in a beam direction of said transmitting antenna; and transmitting said packet from said transmitting antenna over said transmission medium when said transmission medium is free.

2. A computer-based method as claimed in claim 1 wherein said determining operation comprises performing carrier sensing on said transmitting antenna.

3. A computer-based method as claimed in claim 1 further comprising:

detecting an outcome of said transmitting operation, said outcome being one of a successful and an unsuccessful transmission of said packet;

establishing a forced idle period for a forced idle state in response to said outcome; and placing said transmitting node in said forced idle state to prevent an initiation of packet transmission from said transmitting node during said forced idle period.

4. A computer-based method as claimed in claim 3 wherein said transmitting node further includes a router in communication with said transceiver, said router providing said packet to said transceiver, and said method further comprises communicating said outcome to said router.

5. A computer-based method as claimed in claim 3 wherein said plurality of antennas includes an omnidirectional antenna and directional antennas, said transmitting antenna is one of said directional antennas, and said placing operation further comprises switching from said transmitting antenna to said omnidirectional antenna.

6. A computer-based method as claimed in claim 3 further comprising enabling said transmitting node to receive said packet transmissions initiated at another of said nodes when said transmitting node is in said forced idle state.

7. A computer-based method as claimed in claim 1 further comprising:

establishing a forced idle period for a forced idle state when said determining operation determines that said transmission medium is busy; and placing said transmitting node in said forced idle state to prevent an initiation of said transmitting operation during said forced idle period.

8. A computer-based method as claimed in claim 7 further comprising:

repeating said determining operation following expiration of said forced idle period; and executing said transmitting operation when said transmission medium is free.

9. A computer-based method as claimed in claim 8 further comprising:

ascertaining that said transmission medium is busy during each of a pre-determined number of repetitions of said determining operation;

verifying, in response to said ascertaining operation, that said transmitting node remains switched to said transmitting antenna;

detecting that said transmission medium is free for a carrier sensing period; and immediately performing said transmitting operation following said detecting operation.

10. A computer-based method as claimed in claim 1 further comprising:

sending, prior to said transmitting operation, a transmission request from said transmitting antenna over said transmission medium;

delaying said transmitting operation for a switching period.

11. A computer-based method as claimed in claim 10 further comprising receiving said transmission request in association with said packet.

12. A computer-based method as claimed in claim 1 wherein said transmitting node further comprises a router in communication with said transceiver, said router providing said packet, and said method further comprises:

receiving an acknowledgement (ACK) request in association with said packet;

setting an ACK period following said transmitting operation;

detecting an ACK signal from said receiving node during said ACK period; and communicating, in response to said ACK signal, a positive outcome of said transmitting operation to said router, said positive outcome indicating a successful transmission of said packet.

13. A computer-based method as claimed in claim 12 further comprising:

failing to detect said ACK signal during said ACK period; and communicating a negative outcome of said transmitting operation to said router following expiration of said ACK period, said negative outcome indicating an unsuccessful transmission of said packet.

14. A computer-based method as claimed in claim 1 further comprising:

receiving a transmission request and an acknowledgement (ACK) request in association with said packet;

sending, prior to said transmitting operation, said transmission request from said transmitting antenna over said transmission medium;

setting an authorization period at said transmitting node;

detecting a transmission authorization signal from said receiving node prior to expiration of said authorization period; and initiating said transmitting operation in response to said detecting operation.

15. A computer-based method as claimed in claim 14 further comprising:

failing to detect said transmission authorization signal during said authorization period;

establishing a forced idle period for a forced idle state in response to said failing operation; and placing said transmitting node in said forced idle state to prevent said initiating operation during said forced idle period.

16. A computer-based method as claimed in claim 15 wherein said transmitting node includes a router in communication with said transceiver for providing said packet, and said method further comprises communicating a negative outcome of said transmitting operation to said router following expiration of said authorization period, said negative outcome indicating an unsuccessful transmission of said packet.

17. A computer-based method as claimed in claim 14 wherein said transmitting node includes a router in communication with said transceiver for providing said packet, and said method further comprises:

establishing an ACK period at said transmitting node in response to said transmitting operation;

detecting an ACK signal from said receiving node during said ACK period; and communicating a positive outcome of said transmitting operation to said router in response to said ACK signal, said positive outcome indicating a successful transmission of said packet.

18. A computer-based method as claimed in claim 17 wherein said establishing operation comprises determining said forced idle period in response to a size of said packet.

19. A computer-based method as claimed in claim 17 further comprising:
   failing to detect said ACK signal during said ACK period; and
   communicating a negative outcome to said router following expiration of said ACK period, said negative outcome indicating an unsuccessful transmission of said packet.

20. A computer-based method as claimed in claim 14 further comprising establishing a transmission power level for said transmission request, wherein said sending operation sends said transmission request at said transmission power level, and said transmitting operation transmits said packet at an adjusted power level relative to said transmission power level and a received signal strength of said transmission authorization signal.

21. A computer-based method as claimed in claim 14 further comprising:
   establishing a transmission power level for said transmission request such that said sending operation sends said transmission request at said transmission power level;
   detecting a negative outcome of said transmitting operation;
   increasing said transmission power level to obtain an incremented power level; and
   repeating said sending operation at said incremented power level.

22. A computer-based method as claimed in claim 1 wherein said transmitting operation comprises establishing a transmission power level for said packet, and said transmitting operation transmits said packet at said transmission power level.

23. A computer-based method as claimed in claim 22 wherein said establishing operation comprises receiving said transmission power level in association with said packet.

24. A computer-based method as claimed in claim 1 wherein said transmitting node is a first node, and said method further comprises:
   placing said first node in an idle state following said transmitting operation; and
   receiving, at said first node, a data structure from a second node of said nodes when said first node is in said idle state.

25. A computer-based method as claimed in claim 24 further comprising:
   initiating an escape time period in response to said receiving operation; and
   discontinuing said receiving operation when said escape time period expires.

26. A computer-based method as claimed in claim 24 further comprising:
   determining that said data structure is unintended for said first node; and
   ignoring said data structure.

27. A computer-based method as claimed in claim 24 wherein said transmitting node further includes a router in communication with said transceiver, and said method further comprises:
   determining that said data structure is a second packet intended for said first node; and
   delivering said second packet to said router.

28. A computer-based method as claimed in claim 24 wherein said plurality of antennas includes an omnidirectional antenna and directional antennas, said transmitting antenna is a first one of said directional antennas, and said placing operation further comprises switching from said transmitting antenna to said omnidirectional antenna to place said first node in said idle state.

29. A computer-based method as claimed in claim 28 wherein said receiving operation comprises:
   determining that said data structure includes a source identifier for said second node and a transmission request;
   selecting a second one of said directional antennas in response to said source identifier;
   switching to said second directional antenna; and receiving a second packet at said second directional antenna during a data receive period.

30. A computer-based method as claimed in claim 29 further comprising:
   detecting a failure to receive said second packet during said data receive period; and
   recording said failure as an error event when said data receive period expires.

31. A computer-based method as claimed in claim 28 wherein said receiving operation comprises:
   determining that said data structure further includes an acknowledge (ACK) request;
   sending a transmission authorization signal from said second directional antenna over said transmission medium in response to said transmission request and said ACK request; and
   sending an ACK signal from said second directional antenna following receipt of said second packet.

32. A computer-based method as claimed in claim 28 wherein said receiving operation comprises:
   determining that said data structure includes a source identifier and an acknowledge (ACK) request;
   selecting a second one of said directional antennas in response to said source identifier;
   switching to said second directional antenna;
   receiving said second packet at said second directional antenna during a data receive period; and
   transmitting from said second directional antenna over said transmission medium an ACK signal following receipt of said second packet.

33. A computer-based method as claimed in claim 32 further comprising:
   detecting a failure to receive said second packet during said data receive period; and
   recording said failure as an error event when said data receive period expires.

34. In a node of a wireless network, a system for controlling access to a transmission medium, said node configured for communicating with other nodes in said wireless network over said transmission medium, said node including a router for providing a packet for transmission over said transmission medium, said packet including a destination identifier of a receiving node of said other nodes, said node further including a transceiver for obtaining said packet from said router, an omnidirectional antenna, directional antennas, and a switch selectively interconnecting said omnidirectional antenna and said directional antennas with said transceiver, said system comprising:
   a processor, in communication with said router and said transceiver for controlling access to said transmission medium; and a memory element, in communication with said processor, for storing a database of transmission characteristics for each of said omnidirectional and directional antennas, wherein said processor performs operations comprising:
accessing said database to select one of said omnidirectional antenna and said directional antennas to be a transmitting antenna in response to said destination identifier;
activating said switch to interconnect said transceiver and said transmitting antenna;
performing carrier sensing on said transmitting antenna to determine whether said transmission medium is free in a beam direction of said transmitting antenna;
when said transmission medium is free, initiating transmission of said packet from said transmitting antenna over said transmission medium; and
when said transmission medium is busy, preventing said transmission of said packet.

35. A system as claimed in claim 34 further comprising:
establishing a forced idle period for a forced idle state when said transmission medium is busy; and
placing said node in said forced idle state for said forced idle period.

36. A system as claimed in claim 34 wherein said processor performs further operations comprising:
detecting an outcome of said transmission of said packet, said outcome being one of a successful and an unsuccessful transmission of said packet;
establishing a forced idle period for a forced idle state in response to said outcome; and
placing said node in said forced idle state for said forced idle period.

37. A system as claimed in claim 36 wherein said processor performs a further operation of activating said switch when said transmitting antenna is one of said directional antennas to switch from said transmitting antenna to said omnidirectional antenna during said forced idle period.

38. A system as claimed in claim 36 wherein said processor performs a further operation of enabling said transceiver to receive packet transmissions initiated at said other nodes when said node is in said forced idle state.

39. A system as claimed in claim 34 wherein said processor performs further operations comprising:
receiving a transmission request in association with said packet;
sending, prior to said initiating operation, said transmission request from said transmitting antenna over said transmission medium; and
delaying said initiating operation for a switching period.

40. A system as claimed in claim 34 wherein said processor performs further operations comprising:
receiving an acknowledge (ACK) request in association with said packet;
setting an ACK period following said transmitting operation;
when an ACK signal from said other node is detected during said ACK period, communicating a positive outcome of said transmission of said packet to said router, said positive outcome indicating a successful transmission of said packet; and
when said ACK period expires without detection of said ACK signal, communicating a negative outcome of said transmission of said packet to said router, said negative outcome indicating an unsuccessful transmission of said packet.

41. A system as claimed in claim 34 wherein said processor performs further operations comprising:
receiving a transmission request and an acknowledgement (ACK) request in association with said packet;
sending, prior to said transmitting operation, said transmission request from said transmitting antenna over said transmission medium;
setting an authorization period at said transmitting node;
when a transmission authorization signal is detected prior to expiration of said authorization period, executing said initiating operation;
when said authorization period expires without detection of said transmission authorization signal, communicating a negative outcome of said transmission of said packet to said router, said negative outcome indicating an unsuccessful transmission of said packet;
establishing an acknowledge (ACK) period in response to said initiating operation;
when an ACK signal from said other node is detected during said ACK period, communicating a positive outcome of said transmission of said packet to said router, said positive outcome indicating a successful transmission of said packet; and
when said ACK period expires without detection of said ACK signal, communicating said negative outcome of said transmission of said packet to said router.

42. A system as claimed in claim 34 wherein said processor performs further operations comprising:
receiving a transmission power level in association with said packet; and
initiating said transmission of said packet at said transmission power level.

43. A computer readable medium having stored thereon executable code for causing a processor of a node in a wireless network to carry out a method of controlling access to a transmission medium, wherein the node includes a router, a transceiver, a plurality of antennas, and a switch for selectively interconnecting one of said plurality of antennas with said transceiver, and the method comprises:
a) configuring said node to transmit a packet over said transmission medium, by:
obtaining said packet from said router, said packet including a destination identifier;
selecting said one of said plurality of antennas in response to said destination identifier to be said transmitting antenna;
activating said switch to interconnect said transceiver and said transmitting antenna;
performing carrier sensing on said transmitting antenna to determine whether said transmission medium is free in a beam direction of said transmitting antenna; and
transmitting said packet from said transmitting antenna over said transmission medium when said transmission medium is free; and
b) configuring said node to receive a second packet at a second antenna over said communication medium, by:
placing said node in an idle state following said transmitting operation;
receiving a data structure from said second node when said node is in said idle state;
receiving said second packet from said second node in response to said data structure; and
delivering said second packet to said router.

44. A computer-readable storage medium as claimed in claim 43 wherein said plurality of antennas includes an omnidirectional antenna and directional antennas, said transmitting antenna is one of said directional antennas, and said executable code causes said processor to switch from said transmitting antenna to said omnidirectional antenna to place said node in said idle state.

45. A computer-readable storage medium as claimed in claim 44 wherein said executable code causes said processor to perform further operations comprising:
   determining that said data structure is said second packet; and
   receiving said second packet at said omnidirectional antenna.

46. A computer-readable storage medium as claimed in claim 44 wherein said executable code causes said processor to perform further operations comprising:
   determining that said data structure includes a source identifier and a transmission request;
   selecting, in response to said source identifier, another of said directional antennas to be a receiving antenna;
   activating said switching system to switch from said omnidirectional antenna to said receiving antenna, said second packet being received at said receiving antenna.

47. A computer-readable storage medium as claimed in claim 46 wherein said executable code causes said processor to perform further operations comprising:
   determining that said data structure further includes an acknowledge (ACK) request;
   sending a transmission authorization signal from said receiving antenna over said transmission medium; and
   sending an ACK signal from said receiving antenna over said transmission medium following receipt of said second packet.

48. A computer-readable storage medium as claimed in claim 44 wherein said executable code causes said processor to perform further operations comprising:
   determining that said data structure includes a source identifier and an acknowledge (ACK) request;
   selecting, in response to said source identifier, another of said directional antennas to be a receiving antenna;
   activating said switching system to switch from said omnidirectional antenna to said receiving antenna, said second packet being received at said receiving antenna; and
   sending an ACK signal over said transmission medium from said receiving antenna following receipt of said second packet.

49. A computer readable medium having stored thereon executable code for causing a processor of a node in a wireless network to carry out a method of controlling access to a transmission medium, wherein the node includes a router, a transceiver, a plurality of antennas, and a switch for selectively interconnecting one of said plurality of antennas with said transceiver, and the method comprises:
   obtaining a packet from said router for transmission over said transmission medium, said packet including a destination identifier;
   selecting said one of said plurality of antennas in response to said destination identifier to be said transmitting antenna;
   activating said switch to interconnect said transceiver and said transmitting antenna;
   performing carrier sensing on said transmitting antenna to determine whether said transmission medium is free in a beam direction of said transmitting antenna;
   when said transmission medium is busy, said executable code further causes said processor to perform operations comprising:
      establishing a first forced idle period for a force idle state in response to a determination that said transmission medium is busy; and
      placing said node in said forced idle state for said first forced idle period; and
   when said transmission medium is free, said executable code further causes said processor to perform operations comprising:
      transmitting said packet from said transmitting antenna over said transmission medium;
      when an outcome of said transmitting operation is a successful transmission of said packet, said executable code further causes said processor to establish a second forced idle period for said forced idle state and place said node in said forced idle state for said second forced idle period; and
      when an outcome of said transmitting operation is an unsuccessful transmission of said packet, said executable code further causes said processor to establish a third forced idle period for said forced idle state and place said node in said forced idle state for said third forced idle period.

50. A computer-readable storage medium as claimed in claim 49 wherein said executable code causes said processor to perform further operations comprising:
   receiving an acknowledgment (ACK) request in association with said packet; and
   computing said third forced idle period in response to a failure to detect an ACK signal from a receiving node of said other nodes, said failure to detect said ACK signal indicating said unsuccessful transmission of said packet.

51. A computer-readable storage medium as claimed in claim 49 wherein said executable code causes said processor to perform further operations comprising:
   receiving a clear-to-send (CTS) request in association with said packet; and
   computing said third forced idle period in response to a failure to detect a CTS signal from a receiving node of said other nodes, said failure to detect said CTS signal indicating said unsuccessful transmission of said packet.

* * * * *